United States Patent
Nakajima

(10) Patent No.: US 7,636,084 B2
(45) Date of Patent: Dec. 22, 2009

(54) TOUCH PANEL, FILM THEREFOR, AND PROTECTION SHEET THEREFOR THAT CAN EXTEND THE LIFE CYCLE OF THE TOUCH PANEL

(75) Inventor: Takashi Nakajima, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 12/199,384

(22) Filed: Aug. 27, 2008

(65) Prior Publication Data

US 2008/0309642 A1  Dec. 18, 2008

(51) Int. Cl.
  *G06F 3/04* (2006.01)
(52) U.S. Cl. ...................... 345/173; 345/179
(58) Field of Classification Search ................ 345/156, 345/173–179; 178/18.01, 18.05, 19.01, 19.04
  See application file for complete search history.

(56) References Cited

U.S. PATENT DOCUMENTS

| | | | |
|---|---|---|---|
| 6,507,337 B1 | 1/2003 | Sato et al. | |
| 7,289,111 B2 * | 10/2007 | Asbill | 345/174 |
| 2004/0013892 A1 | 1/2004 | Yano et al. | |
| 2004/0239641 A1 | 12/2004 | Takahata et al. | |
| 2004/0242824 A1 | 12/2004 | Miyaki et al. | |
| 2005/0237307 A1 | 10/2005 | Hieda et al. | |
| 2006/0041067 A1 | 2/2006 | Sugamoto et al. | |

FOREIGN PATENT DOCUMENTS

| | | |
|---|---|---|
| JP | 61-237313 | 10/1986 |
| JP | 3-216718 | 9/1991 |
| JP | 9-031421 | 2/1997 |
| JP | 9-235525 | 9/1997 |
| JP | 9-305289 | 11/1997 |
| JP | 2001-060144 | 3/2001 |
| JP | 2002-197924 | 7/2002 |
| JP | 2003-157149 | 5/2003 |
| KR | 2003054818 A * | 7/2003 |

OTHER PUBLICATIONS

U.S. Appl. No. 10/870,029, filed Jun. 18, 2004, Takashi Nakajima, Fujitsu Component Limited of Tokyo, Japan.
Japanese Office Action mailed Jan. 20, 2009 for corresponding Japanese Patent Application No. 2004-096230.
Restriction Requirement dated Oct. 9, 2007 for related U.S. Appl. No. 12/199,384.
Office Action dated Feb. 5, 2008 for related U.S. Appl. No. 12/199,384.
Notice of Allowance dated Jul. 10, 2008 for related U.S. Appl. No. 12/199,384.

* cited by examiner

*Primary Examiner*—Ricardo L Osorio
(74) *Attorney, Agent, or Firm*—Staas & Halsey LLP

(57) ABSTRACT

A touch panel includes a membrane adapted to receive a pressing and/or rubbing operation from an external pen. A transparent conductive film is disposed with respect to the membrane. The membrane includes a structure that suppresses generation of friction heat due to the pressing and/or rubbing operation.

6 Claims, 21 Drawing Sheets $p_3 > p_2$

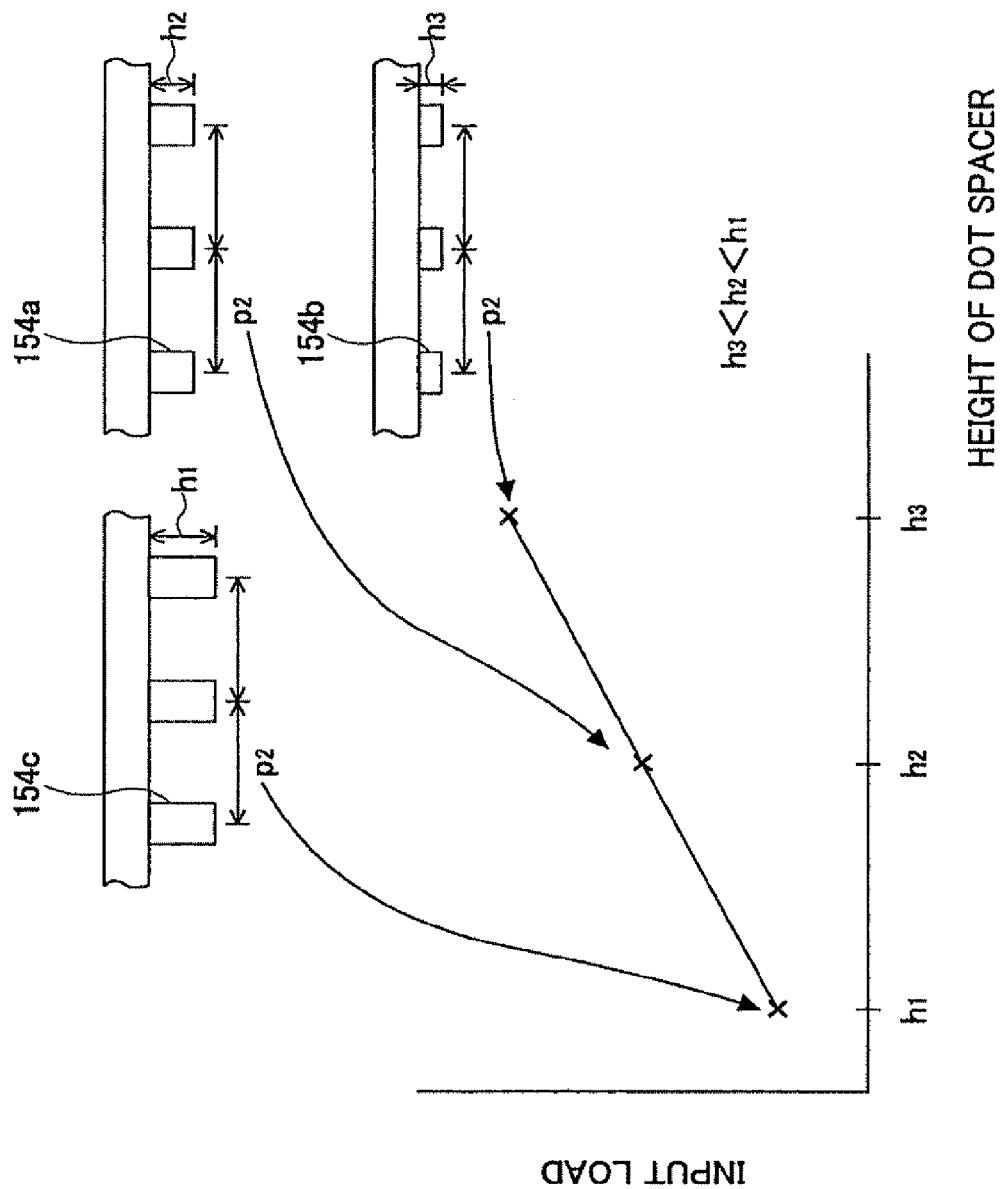

TOUCH PANEL, FILM THEREFOR, AND PROTECTION SHEET THEREFOR THAT CAN EXTEND THE LIFE CYCLE OF THE TOUCH PANEL

CROSS-REFERENCE TO RELATED APPLICATIONS

This application is related to and claims the benefit to application Ser. No. 10/870,029, filed Jun. 18, 2004, now pending, and claims priority benefit of Japanese Application No. 2004-096230, filed Mar. 29, 2004, the entire contents of which are hereby incorporated by reference.

BACKGROUND OF THE INVENTION

1. Field of the Invention

The present invention generally relates to touch panels, and more particularly, to a pen input type analog resistance film touch panel used as an input device that is disposed on a display surface of a liquid crystal panel of, for example, a PDA (Personal Digital Assistant) or a notebook computer, and on which input device an input is directly made on a display surface thereof by using a pen. The pen input type analog resistance film touch panel uses an analog resistance film method as the detection principle of X-Y coordinate, and uses a general detection method for detecting the coordinate of an input point.

2. Description of the Related Art

In electronic devices that are required to have small sizes, such as PDAs and notebook computers, it is also required to have a small touch panel. In order to reduce the size of a touch panel, it is desirable to use a general detection method for detecting the coordinate of an input point, since it is possible to reduce a dead space around a glass board. In the general detection method for detecting the coordinate of an input point, the potential gradient of a transparent conductive film on a film is used for detecting the X coordinate of the input point, and the potential gradient of a transparent conductive film on a glass board is used for detecting the Y coordinate of the input point.

FIGS. 1 and 2 show a conventional pen input type analog resistance film touch panel (hereinafter simply referred to as "the touch panel") 10 that uses a general detection method for detecting the coordinate of an input point. In FIG. 1, arrows $X_1$ and $X_2$ represent the directions ($X_1$-$X_2$ directions) along the longer side of the touch panel 10, and arrows $Y_1$ and $Y_2$ represent the directions ($Y_1$-$Y_2$ directions) along the shorter side of the touch panel 10. In the touch panel 10, a film 20 is bonded to the top surface of a quadrangular glass board 11, which is a substrate, by a double-faced adhesive tape 19. The film 20 covers the glass board 11 via an air layer 18 (FIG. 2). A flexible cable 16 extends from the top surface of the glass substrate 11. A transparent conductive film 12 is formed on the top surface of the glass board 11. Dot spacers 13 (FIG. 2) are formed thereon in a dispersed manner. Elongated electrodes 14 and 15 are formed on the top surface of the glass board 11 along the sides of the glass board 11 opposing in the $Y_1$-$Y_2$ directions. In the film 20, a transparent conductive film 22 is formed on and adheres to the bottom surface of a PET (Polyethylene Terephthalate) film body 21. Additionally, an acrylate resin layer 23 is formed on the top surface of the PET film body 21 as a hard coat layer so as to protect the surface of the PET film body 21. Further, elongated electrodes 24 and 25 are formed along the sides of the film 20 opposing in the $X_1$-$X_2$ directions.

As shown in FIG. 2, the touch panel 10 is mounted on the top surface of a liquid crystal panel and the periphery of the touch panel 10 is covered by a cover 31, thereby constructing a PDA 10A. By using a pen 35 made of polyacetal, an operator of the PDA 10A writes characters on the top surface of the film 20 and/or performs an input operation of pressing a predetermined portion of the top surface of the film 20.

When the pen 35 is pressed against the top surface of the film 20, the film 20 is bent as indicated by two-dot chain lines in FIG. 2, and the transparent conductive film 22 of the film 20 contacts the transparent conductive film 12 on the glass board 11 at the portion (contact point) where the pen 35 is pressed against.

When a voltage is applied between the elongated electrodes 14 and 15, a potential gradient in the $X_1$-$X_2$ directions is established by the transparent conductive film 12 on the glass board 11, the potential of the contact point is detected via the transparent conductive film 22 of the film 20, and the X coordinate of the contact point is determined from a predetermined mathematical expression representing a partial pressure.

When a voltage is applied between the elongated electrodes 24 and 25, a potential gradient is established in the $Y_1$-$Y_2$ directions by the transparent conductive film 22 of the film 20, the potential of the contact point is detected via the transparent conductive film 12 on the glass board 11, and the Y coordinate of the contact point is determined from a predetermined mathematical expression representing a partial pressure.

Since the transparent conductive films 12 and 22 are hard materials, peeling and/or cracking tend to occur due to a physical operation. The film 20 is bent in a portion against which the pen 35 is pressed. Hence, a tensile stress is applied to the transparent conductive film 22 of the film 20 at the bent portion. Thus, during long usage of the PDA 10A, peeling and/or cracking gradually occur. When peeling and/or cracking occurs in the transparent conductive film 22 of the film 20, resistance distribution of the transparent conductive film 22 varies, and an error is generated between the X coordinate of a position against which the pen 35 is pressed and the X coordinate that is output from the touch panel 10 as a signal. Consequently, the linearity, which is one of the characteristics required for the touch panel 10, is decreased, i.e., the numerical value representing the linearity is increased. The linearity required by markets is, for example, 1% or less (see FIG. 3, discussed in greater detail below). Thus, later in the service period of the PDA, a reduction of the linearity appears. When the linearity decreases to such an extent that it does not meet the specification, the PDA 10A starts to perform an operation different from that instructed by the pen 35, which is the end of the life cycle (service life) of the touch panel 10. As long as the PDA 10A is normally used, the life cycle of the touch panel 10 is sufficiently long, and there is no particular problem.

Through observation of people using PDAs, the inventor of the present invention has found that, while making a call, for example, some people reciprocally and repeatedly rub the same portion of the touch panel 10 by the pen 35 along an edge of the cover 31 as if they are drawing straight lines and not for performing an input operation. Such operations are severe operations that damage the touch panel 10.

When such severe operations are performed on the touch panel 10, peeling and/or cracking may occur in the transparent conductive film 22 of the film 20 in a relatively early stage. As a result, the linearity may be decreased and the touch panel 10 may come to the end of its life cycle earlier than expected.

Referring to FIG. 1 again, a touch panel protection sheet 40 (hereinafter referred to as "the protection sheet 40") is one of the optional components for the PDA 10A. As shown in FIG. 2, the protection sheet 40 is used by being applied to a surface of the touch panel 10 so as to prevent the surface of the touch panel 10 from being scratched or contaminated. The protection sheet 40 is particularly used for, for example, terminals installed in the outside where the environment is severe, terminals for fast-food restaurants, or terminals for kitchen. When the protection sheet 40 is contaminated, the protection sheet 40 is peeled away and replaced with a new one. A user of the PDA 10A applies and peels away the protection sheet 40. The conventional protection sheet 40 includes an adhesive layer 41 on an entire surface thereof. Hence, there is a problem in that, upon application of the protection sheet 40, air bubbles containing air therein tend to be formed and the air bubbles become conspicuous. In addition, the conventional protection sheet 40 merely protects the surface of the touch panel 10 and does not provide other functions.

SUMMARY OF THE INVENTION

It is a general object of the present invention to provide an improved and useful touch panel in which one or more of the above-mentioned problems are eliminated.

It is another and more specific object of the present invention to provide a touch panel that can resist severe operations and extend the life cycle of the touch panel.

In order to achieve the above-mentioned objects, according to one aspect of the present invention, there is provided a touch panel including:

a membrane adapted to receive a pressing operation and/or a rubbing operation from an external pen; and a transparent conductive film disposed with respect to the membrane, wherein the membrane includes a structure that suppresses generation of friction heat due to the pressing operation and/or the rubbing operation.

According to the present invention, the membrane has a structure that suppresses generation of friction heat at the time of the pressing operation and/or the rubbing operation performed by using a pen. Hence, even if a repetitive operation of rubbing the same portion of the film is performed by using the pen, it is possible to suppress a stress applied to a portion of a transparent conductive film corresponding to the portion of the membrane subjected to the repetitive operation, compared to conventional cases. Thus, it is possible to suppress degradation of the transparent conductive film. Accordingly, the linearity of a touch panel is maintained in a good condition for a long term, and it is possible to achieve a longer life cycle (service life) of the touch panel.

Other objects, features and advantages of the present invention will become more apparent from the following detailed description when read in conjunction with the following drawings.

BRIEF DESCRIPTION OF THE DRAWINGS

FIG. 20 is a graph showing the relationship between the input load and the height of the dot spacers.

DETAILED DESCRIPTION OF THE PREFERRED EMBODIMENTS

A description is given below of preferred embodiments of the present invention, with reference to the drawings.

For convenience of explanation, first, a description is given below of experiments for finding solutions for providing a touch panel that can resist severe operations.

Figure 1:
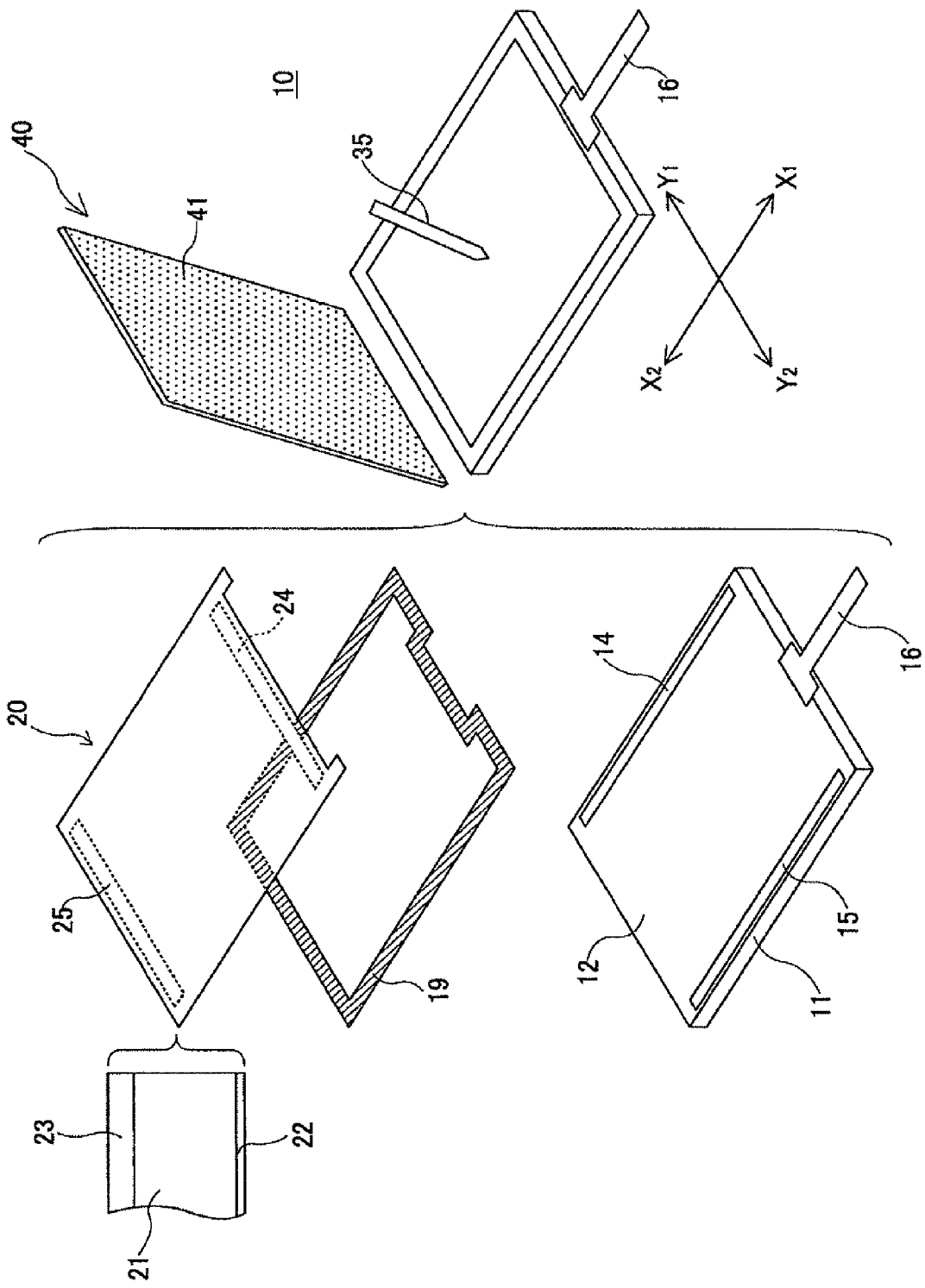
FIG. 1 is a schematic diagram showing a conventional touch panel.

In an environment having normal temperature of 25° C., the process of the increase of the linearity was observed while performing an operation of reciprocally and repeatedly rubbing the same portion of the conventional touch panel 10 shown in FIG. 1. In this case, as indicated by a line I in FIG. 3, the linearity was gradually decreased, i.e., the numerical value representing the linearity is increased, whereby, when the number of times of rubbing (friction) exceeded 100,000 times, the linearity exceeded 1%.

Additionally, the same experiment as mentioned above was conducted in a low temperature environment of −10° C.

Figure 3:
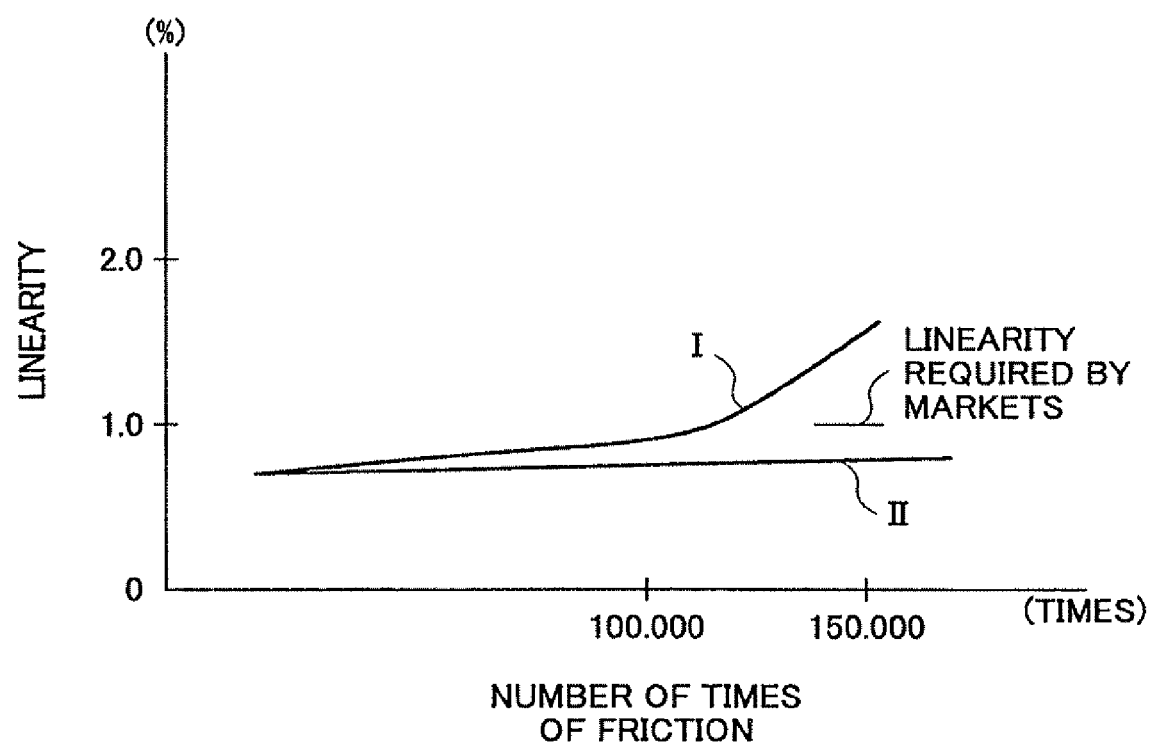
FIG. 3 is a graph showing variations in the linearity of the touch panel shown in FIG. 1 with respect to the number of times of friction by a pen.

In this case, as indicated by a line II in FIG. 3, the linearity was substantially maintained in the initial state irrespective of the increase in the number of times of rubbing (friction). Even after the number of times of rubbing exceeded 100,000 times, the linearity was maintained at 1% or less.

The above-mentioned results can be interpreted as follows. In the case where the environmental temperature is 25° C., frictional heat is generated in the PET film body 21 at the portion rubbed by the pen 35, and the rubbed portion is thermally expanded. Thus, a tensile stress is applied to the transparent conductive film 22 at the portion corresponding to the thermally expanded portion, which causes peeling and/or cracking in the transparent conductive film 22. In the case where the environmental temperature is −10° C., since the temperature is −10° C., which is a relatively lower temperature, even if frictional heat is generated in the PET film body 21 at the portion rubbed by the pen 35, the frictional heat is immediately cooled. For this reason, the PET film body 21 is not thermally expanded and thus a tensile stress is not applied to the transparent conductive film 22.

In other words, though it is generally conceived to increase the mechanical strength of the transparent conductive film 22 by, for example, increasing the thickness of the transparent conductive film 22 so as to suppress peeling and/or cracking in the transparent conductive film 22, the idea is erroneous. It has been found that, even if the thickness of the transparent conductive film 22 is increased, it is difficult to solve the problem, and the problem can be solved by suppressing expansion of the PET film body 21 due to heat.

The present invention has been made on the basis of the results of the above-mentioned experiments.

First Embodiment

Figure 4:
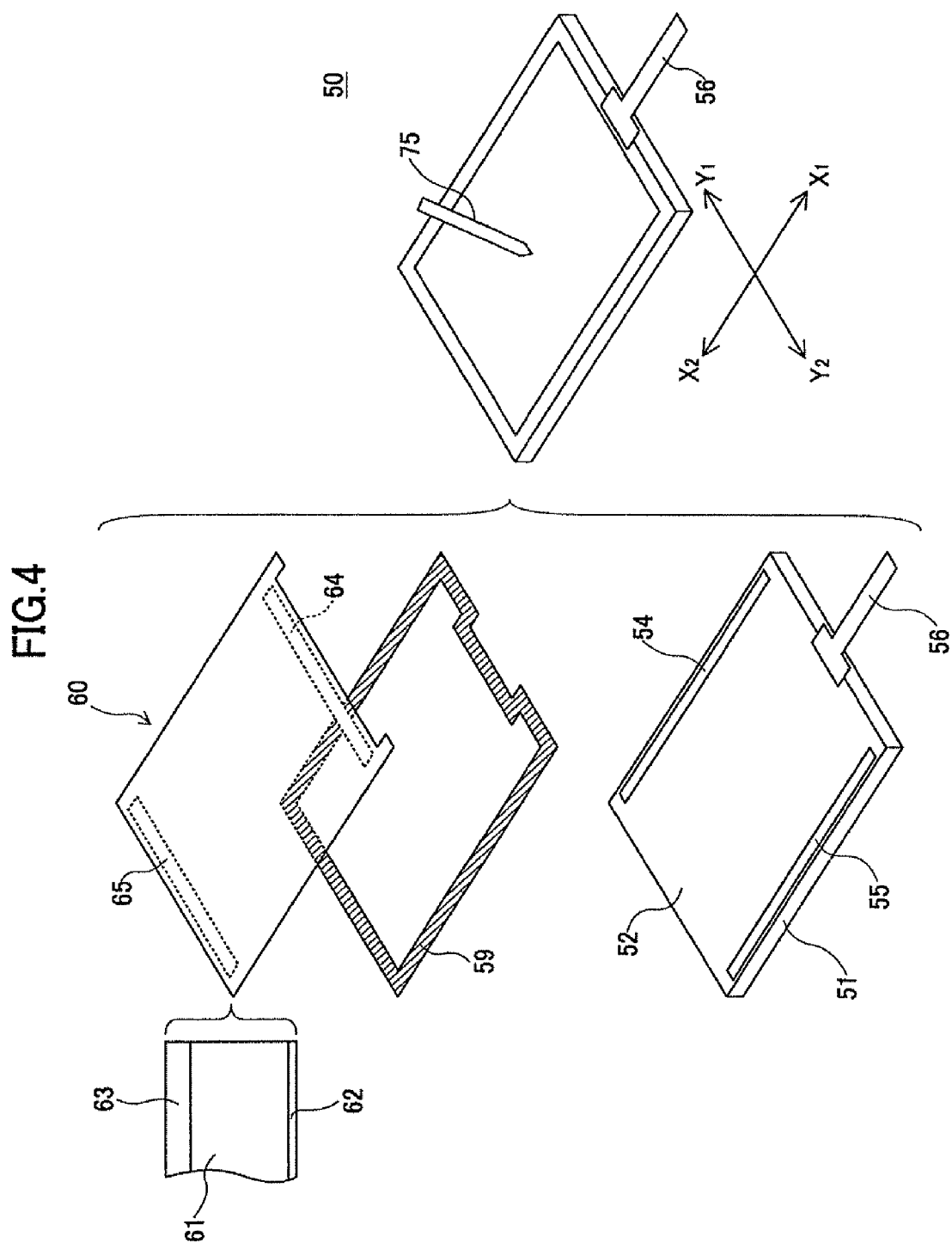
FIG. 4 is a schematic diagram showing a touch panel according to a first embodiment of the present invention.
Figure 5:
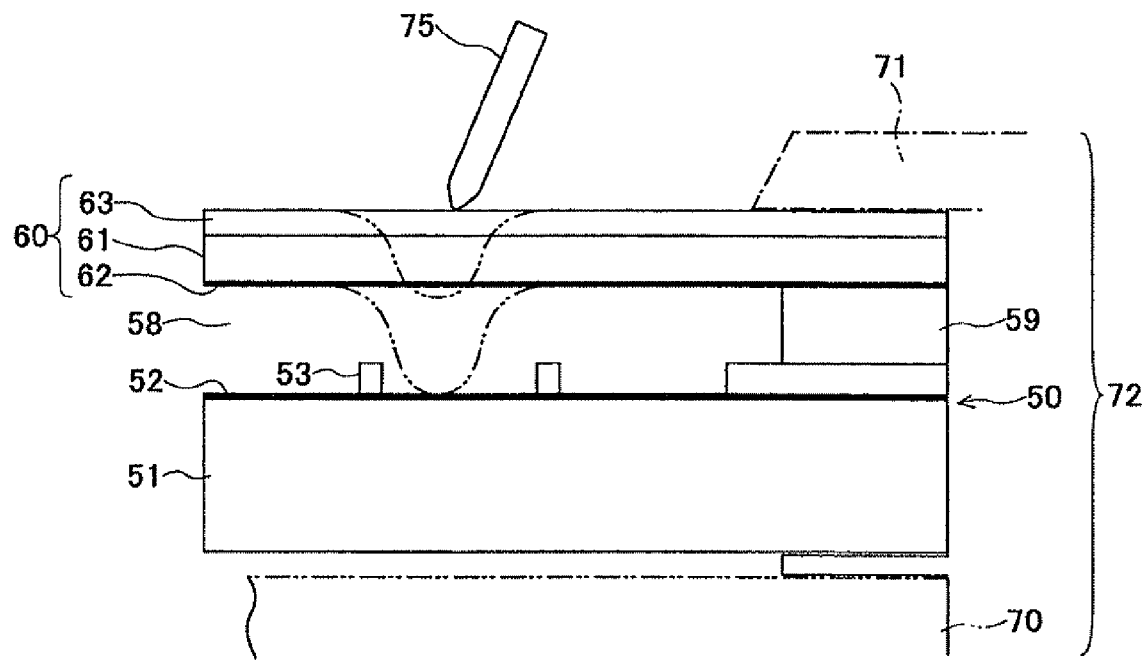
FIG. 5 is a partial cross-sectional view of the touch panel shown in FIG. 4 in an enlarged manner.

FIGS. 4 and 5 show a touch panel 50 according to a first embodiment of the present invention. In FIG. 4, the directions ($X_1$-$X_2$ directions) indicated by arrows $X_1$ and $X_2$ represent the directions along the longer side of the touch panel 50, and the directions ($Y_1$-$Y_2$ directions) indicated by arrows $Y_1$ and $Y_2$ represent the directions along the shorter side of the touch panel 50.

Figure 2:
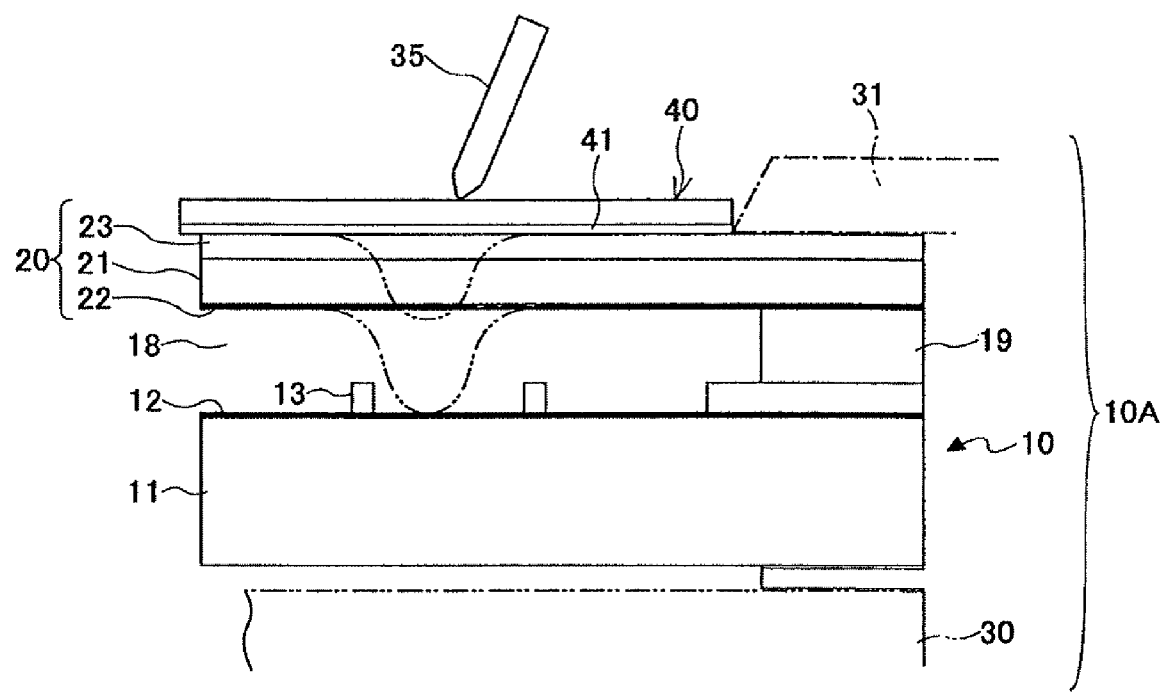
FIG. 2 is a partial cross-sectional view of the touch panel shown in FIG. 1 in an enlarged manner.

The touch panel 50 is a pen input type analog resistance film touch panel and uses a general detection method for detecting the coordinate of an input point. The touch panel 50 differs from the touch panel 10 shown in FIGS. 1 and 2 in that a hard coat layer 63 on the top surface of a PET film body 61 is a heat-resistant acrylic resin layer. In the touch panel 50, a film 60 is bonded to the top surface of a quadrangular glass board 51, which is a substrate, by a double-faced adhesive tape 59 having a frame shape. The film 60 covers the glass board 51 via an air layer 58 (FIG. 5). A flexible cable 56 extends from the top surface of the glass board 51. A transparent conductive film (ITO film) 52 is formed on the top surface of the glass board 51. Dot spacers 53 (FIG. 5) are formed on the top surface of the glass board 51 in a dispersed manner. Elongated electrodes 54 and 55 are formed along the sides of the film 60 opposing in the $Y_1$-$Y_2$ directions. In the film 60, a transparent conductive film (ITO film) 62 is formed on and adheres to the bottom surface of the PET film body 61. The heat-resistant acrylic resin layer 63, which serves as the hard coat layer, is formed on the top surface of the PET film body 61 so as to protect the surface of the PET film body 61. Elongated electrodes 64 and 65 are formed along the sides of the film 60 opposing in the $X_1$-$X_2$ directions. The heat-resistant acrylic resin layer 63 has the heat contraction percentage of 0.5% or less at 100° C., and the friction coefficient of 1.0 or less with respect to a pen 75 made of polyacetal (ASTMD (American Society for Testing and Materials D) 1894).

As shown in FIG. 5, the touch panel 50 is mounted on the top surface of a liquid crystal panel 70 and the periphery of the touch panel 50 is covered by a cover 71, thereby constructing a PDA 72. By using a pen 75 made of polyacetal, an operator of the PDA 72 writes characters on the top surface of the film 60 and/or performs an input operation of pressing a predetermined portion of the top surface of the film 20.

When the pen 75 is pressed against the top surface of the film 60, the film 60 is bent as indicated by two-dotted chain lines in FIG. 5, and the transparent conductive film 62 of the film 60 contacts the transparent conductive film 52 on the glass board 51 at the portion (contact point) where the pen 75 is pressed against.

When a voltage is applied between the elongated electrodes 54 and 55, a potential gradient in the $X_1$-$X_2$ directions is established by the transparent conductive film 62 of the film 60, the potential of the contact point is detected via the transparent conductive film 52 on the glass board 51, and the X coordinate of the contact point is determined from a predetermined mathematical expression representing a partial pressure.

When a voltage is applied between the elongated electrodes 64 and 65, a potential gradient is established in the $Y_1$-$Y_2$ directions by the transparent conductive film 52 on the glass board 51, the potential of the contact point is detected via the transparent conductive film 62 of the film 60, and the Y coordinate of the contact point is determined from a predetermined mathematical expression representing a partial pressure.

A description is given below of a case where an operation of reciprocally and repeatedly rubbing the same portion of the touch panel 50 by the pen 75 is performed.

A normal acrylic resin layer has a friction coefficient of, for example, 1.0 or more with respect to the pen 75 made of polyacetal. On the other hand, the heat-resistant acrylic resin layer 63 has a friction coefficient of 1.0 or less with respect to the pen 75 made of polyacetal, which is smaller than the friction coefficient of the normal acrylic resin layer. Hence, generation of friction heat is suppressed. Accordingly, thermal expansion of the PET film body 61 is suppressed and thus a stress applied to the transparent conductive film 62 is suppressed. Therefore, occurrence of peeling and/or cracking in the transparent conductive film 62 is suppressed.

Figure 6:
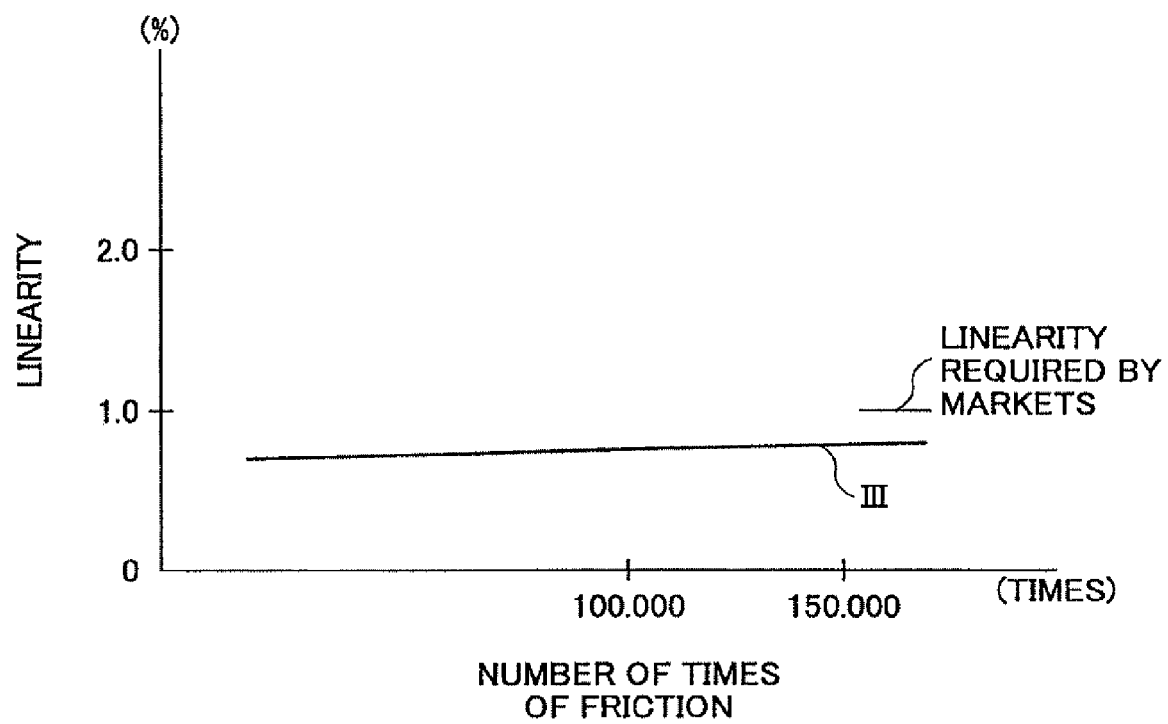
FIG. 6 is a graph showing variations in the linearity of the touch panel shown in FIG. 4 with respect to the number of times of friction by a pen.

The process of the increase in the linearity was observed by performing an operation of rubbing the same portion of the touch panel 50, which is shown in FIGS. 4 and 5, by the pen 75 in an environment having a temperature of 25° C. In this case, the linearity was substantially maintained in the initial state as indicated by a line III in FIG. 6. Even after the number of times of rubbing (friction) exceeds 10,000 times, the linearity was maintained at 1% or less.

Second Embodiment

Figure 7:
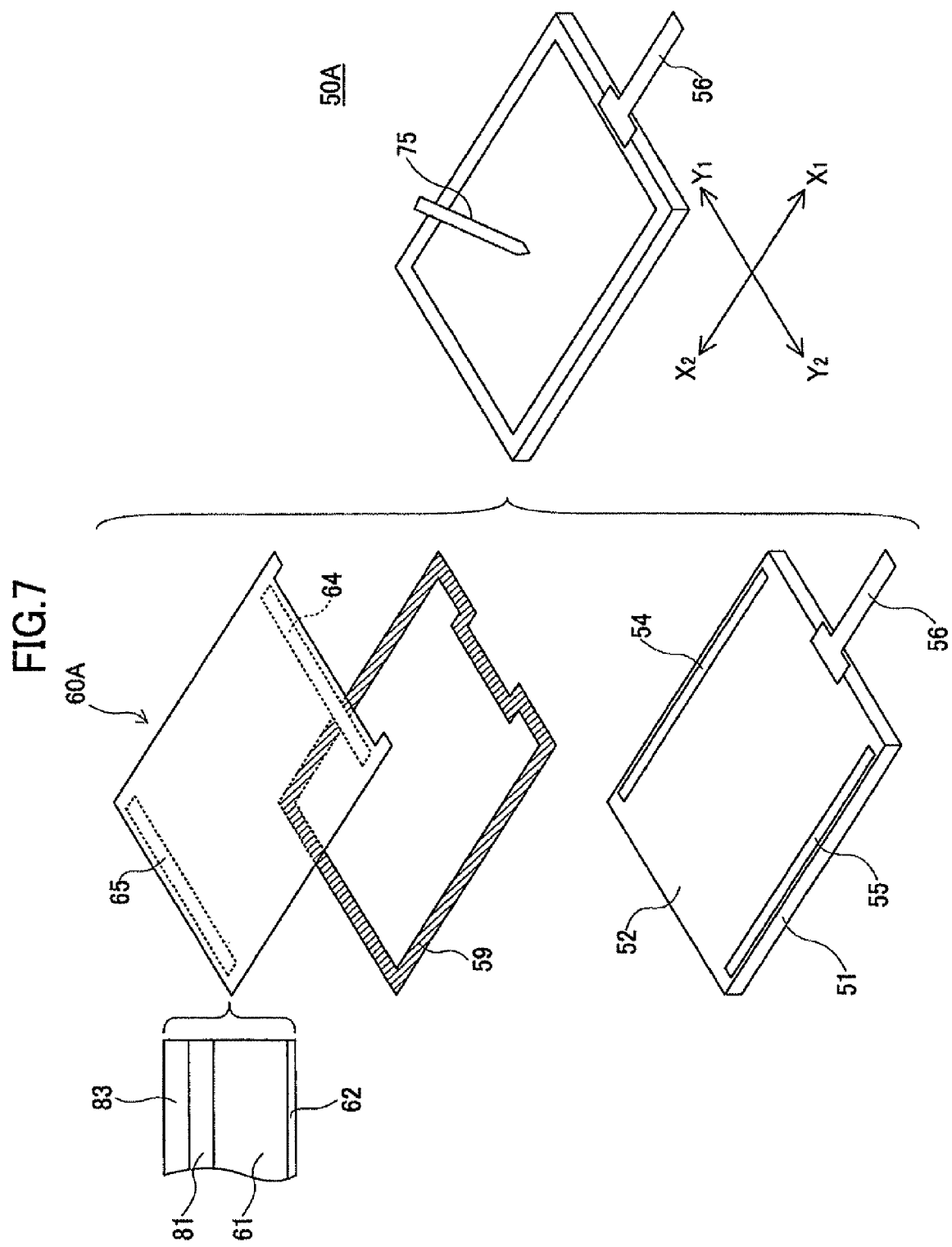
FIG. 7 is a schematic diagram showing a touch panel according to a second embodiment of the present invention.

FIG. 7 shows a touch panel 50A according to a second embodiment of the present invention. The touch panel 50A differs from the touch panel 50 shown in FIGS. 4 and 5 in that the touch panel 50A includes a film 60A. In the film 60A, the transparent conductive film 62 is formed on and adheres to the bottom surface of the PET film body 61. A heat-resistant acrylic resin layer 81 and an acrylic resin layer 83 are superimposed and formed on the top surface of the PET film body 61 in this order. Comparing the film 60A with the film 60 shown in FIG. 4, the acrylic resin layer 83 is additionally provided as part of the film 60A. Comparing the film 60A with the film 20 shown in FIG. 1, the heat-resistant acrylic resin layer 81 is additionally provided as part of the film 60A between the acrylic resin layer 83 and the PET film body 61.

The heat-resistant acrylic resin layer 81 serves to disperse friction heat locally generated in the acrylic resin layer 83 due to the repetitive operation of the pen 75 by causing the friction heat to be thermally conducted in the surface direction of the film 60A.

Accordingly, local thermal expansion of the PET film body 61 is suppressed and thus a stress applied to the transparent conductive film 62 is suppressed. Therefore, occurrence of peeling and/or cracking in the transparent conductive film 62 is suppressed.

Third Embodiment

Figure 8:
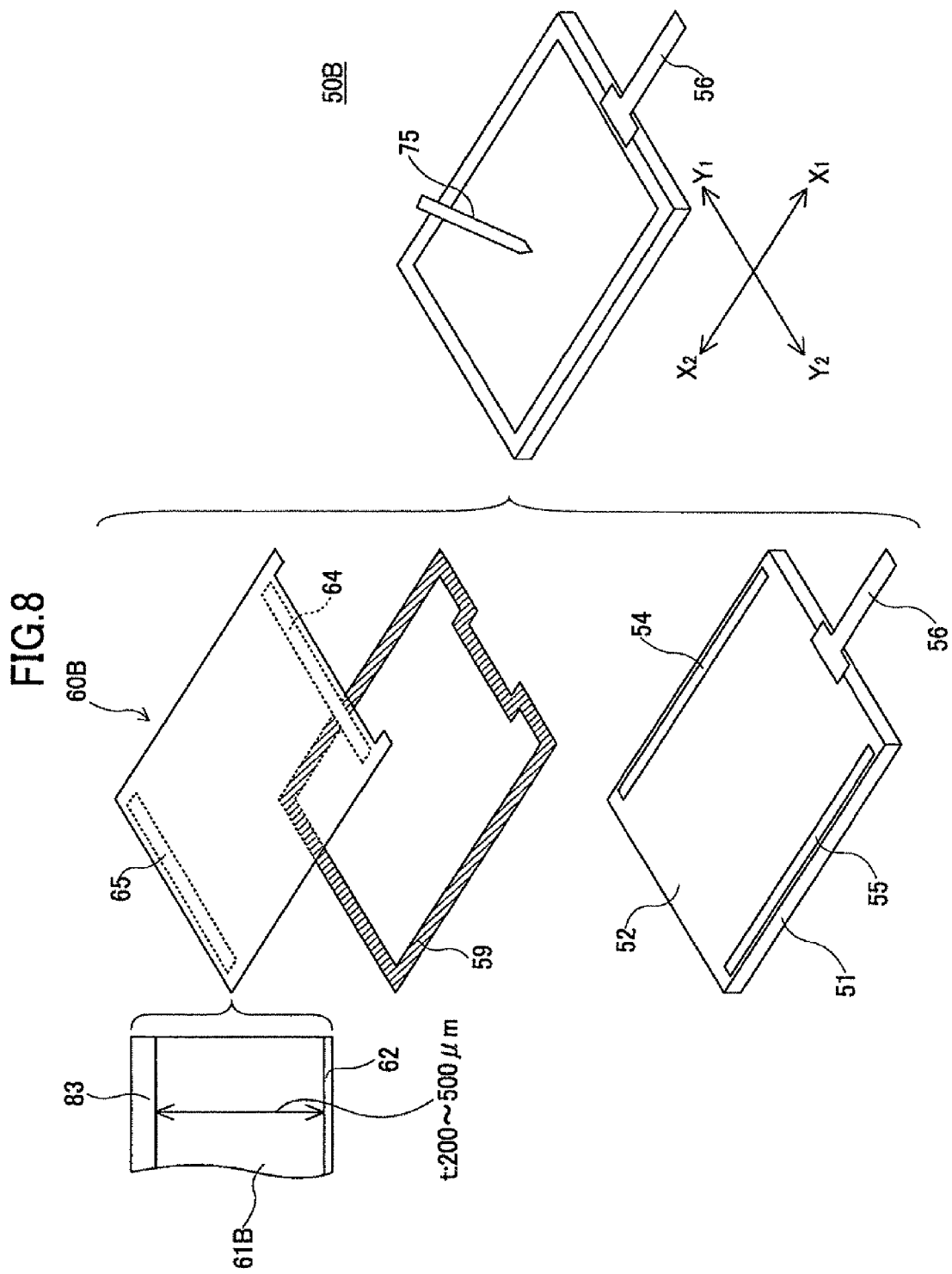
FIG. 8 is a schematic diagram showing a touch panel according to a third embodiment of the present invention.

FIG. 8 shows a touch panel 50B according to a third embodiment of the present invention. The touch panel SOB differs from the touch panel 50 shown in FIGS. 4 and 5 in that the touch panel SOB includes a film 60B. In the film 60B, the transparent conductive film 62 is formed on and adheres to the bottom surface of a PET film body 61B, and the acrylic resin layer 83 is formed on the top surface of the PET film body 61B. Conventionally, the thickness of a PET film body is less than 200 μm. However, the thickness t of the PET film body 61B in accordance with the present invention is 200-500 μm.

Comparing the film 60B with the PET film body 21 shown in FIG. 1, the thickness t of the PET film body 61B is about twice the thickness of the film 20.

The thick PET film body 61B serves to disperse friction heat locally generated in the acrylic resin layer 83 due to the repetitive operation by the pen 75 by causing the friction heat to be thermally conducted in the surface direction and the thickness direction of the film 60B.

Accordingly, local thermal expansion of the PET film body 61B is suppressed, and thus it is prevented that a stress is locally concentrated on and applied to the transparent conductive film 62. Therefore, occurrence of peeling and/or cracking in the transparent conductive film 62 is suppressed.

Fourth Embodiment

Figure 9:
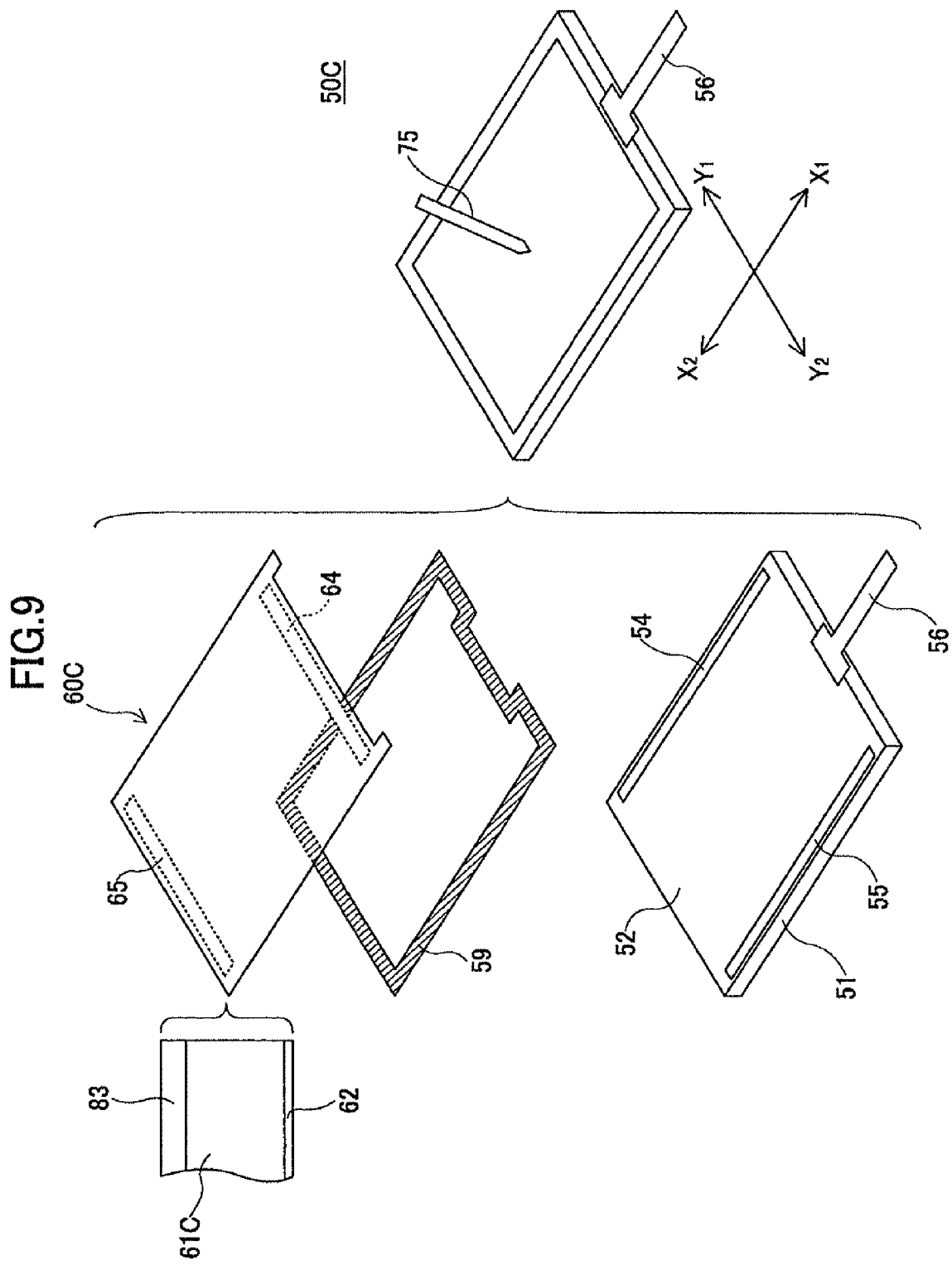
FIG. 9 is a schematic diagram showing a touch panel according to a fourth embodiment of the present invention.

FIG. 9 shows a touch panel 50C according to a fourth embodiment of the present invention. The touch panel 50C differs from the touch panel 50 shown in FIGS. 4 and 5 in that the touch panel 50C includes a film 50C. In the film 60C, the transparent conductive film 62 is formed on and adheres to the bottom surface of a heat-resistant PET film body 61C. The acrylic resin layer 83 is formed on the top surface of the heat-resistant PET film body 61C. Comparing the film 60C with the film 20 shown in FIG. 1, the film 60C includes the heat-resistant PET film body 61C instead of the PET film body 21.

The heat-resistant PET film body 61C has a heat contraction percentage of, for example, 0.5% or less at 100° C., and a friction coefficient of 1.0 or less with respect to the pen 75 made of polyacetal (ASTMD1894). The heat-resistant PET film body 61C serves to disperse friction heat locally generated in the acrylic resin layer 83 by causing the friction heat to be thermally conducted in the surface direction of the film 60C.

Accordingly, local thermal expansion of the heat-resistant PET film body 61C is suppressed, and thus it is prevented that a stress is locally concentrated on and applied to the transparent conductive film 62. Therefore, occurrence of peeling and/or cracking in the transparent conductive film 62 is suppressed.

Fifth Embodiment

Figure 10:
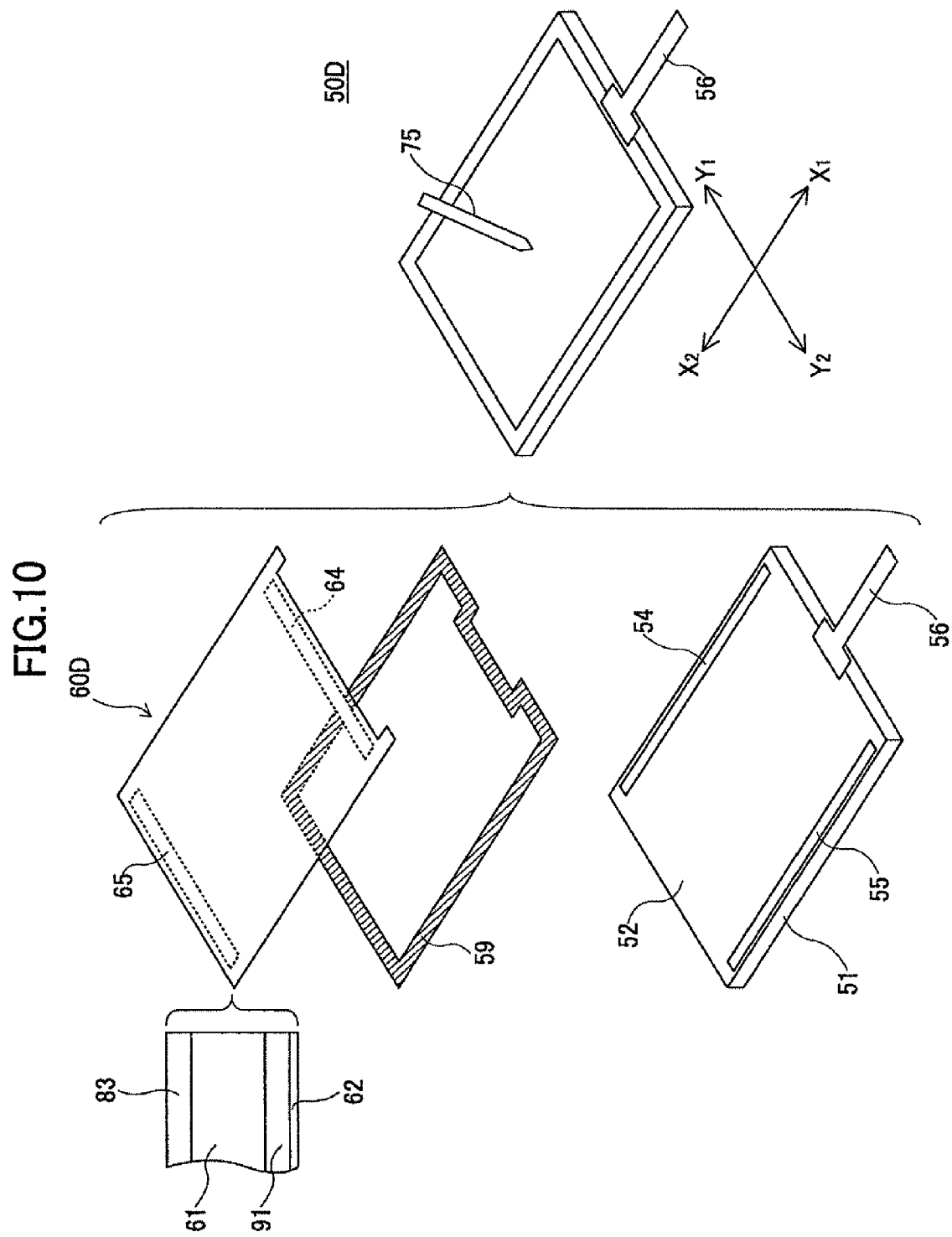
FIG. 10 is a schematic diagram showing a touch panel according to a fifth embodiment of the present invention.

FIG. 10 shows a touch panel 50D according to a fifth embodiment of the present invention. The touch panel 50D differs from the touch panel 50 shown in FIGS. 4 and 5 in that the touch panel 50D includes a film 60D. In the film 60D, a heat-resistant acrylic resin layer 91 is formed on the bottom surface of the heat-resistant PET film body 61. The transparent conductive film 62 is formed on and adheres to the bottom surface of the heat-resistant acrylic resin layer 91. The acrylic resin layer 83 is formed on the top surface of the heat-resistant PET film body 61. Comparing the film GOD with the film 20 shown in FIG. 1, the film 60D additionally includes the heat-resistant acrylic resin layer 91 between the heat-resistant PET film body 61 and the transparent conductive film 62.

The heat-resistant acrylic resin layer 91 serves to disperse friction heat locally generated in the acrylic resin layer 83 due to the repetitive operation by the pen 75 by causing the friction heat to be thermally conducted in the surface direction of the film 60D.

Accordingly, local thermal expansion of the heat-resistant PET film body 61 is suppressed, and thus it is prevented that a stress is locally concentrated on and applied to the transparent conductive film 62. Therefore, occurrence of peeling and/or cracking in the transparent conductive film 62 is suppressed.

Sixth Embodiment

Figure 11:
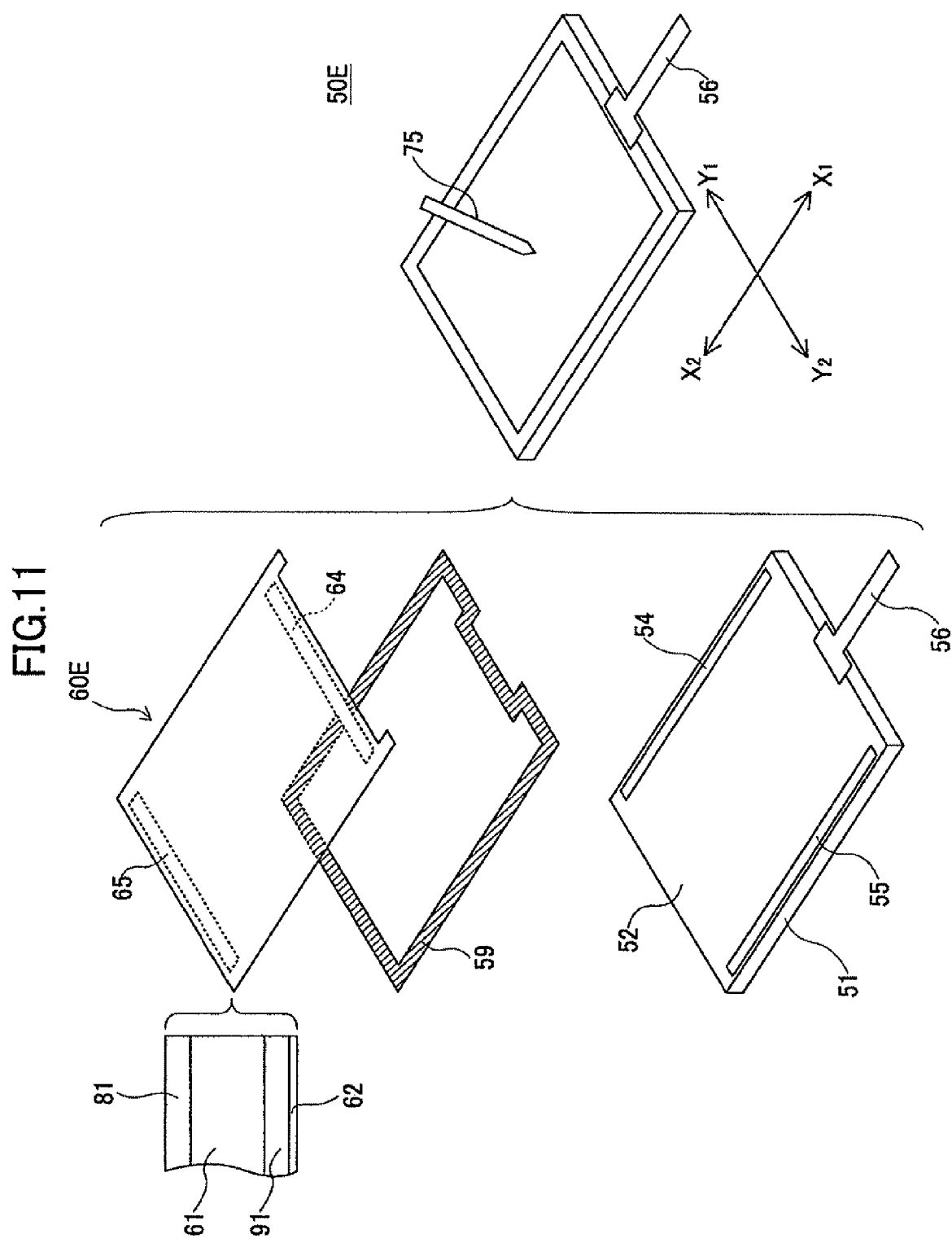
FIG. 11 is a schematic diagram showing a touch panel according to a sixth embodiment of the present invention.

FIG. 11 shows a touch panel 50E according to a sixth embodiment of the present invention. The touch panel 50E differs from the touch panel 50 shown in FIGS. 4 and 5 in that the touch panel 50E includes a film 60E. In the film 60E, the heat-resistant acrylic resin layer 91 is formed on the bottom surface of the heat-resistant PET film body 61. The transparent conductive film 62 is formed on and adheres to the bottom surface of the heat-resistant acrylic resin layer 91. The heat-resistant acrylic resin layer 81 is formed on the top surface of the heat-resistant PET film body 61. Comparing the film 60E with the film 60 shown in FIG. 4, the film 60E additionally includes the heat-resistant acrylic resin layer 91 between the heat-resistant PET film body 61 and the transparent conductive film 62.

Since the heat-resistant acrylic resin layer 81, which is the upper acrylic resin layer, has the characteristics that the friction coefficient thereof is small, the heat-resistant acrylic resin layer 81 serves to suppress friction heat locally generated in the heat-resistant acrylic resin layer 81 in a case where the repetitive operation by the pen 75 is performed. The heat-resistant acrylic resin layer 91, which is the lower acrylic layer, serves to disperse friction heat locally generated in the acrylic resin layer 81 by causing the friction heat to be thermally conducted in the surface direction of the film 60D.

Accordingly, local thermal expansion of the heat-resistant PET film body 61 is suppressed, and thus it is prevented that a stress is locally concentrated on and applied to the transparent conductive film 62. Therefore, occurrence of peeling and/or cracking in the transparent conductive film 62 is suppressed.

Seventh Embodiment

Figure 12:
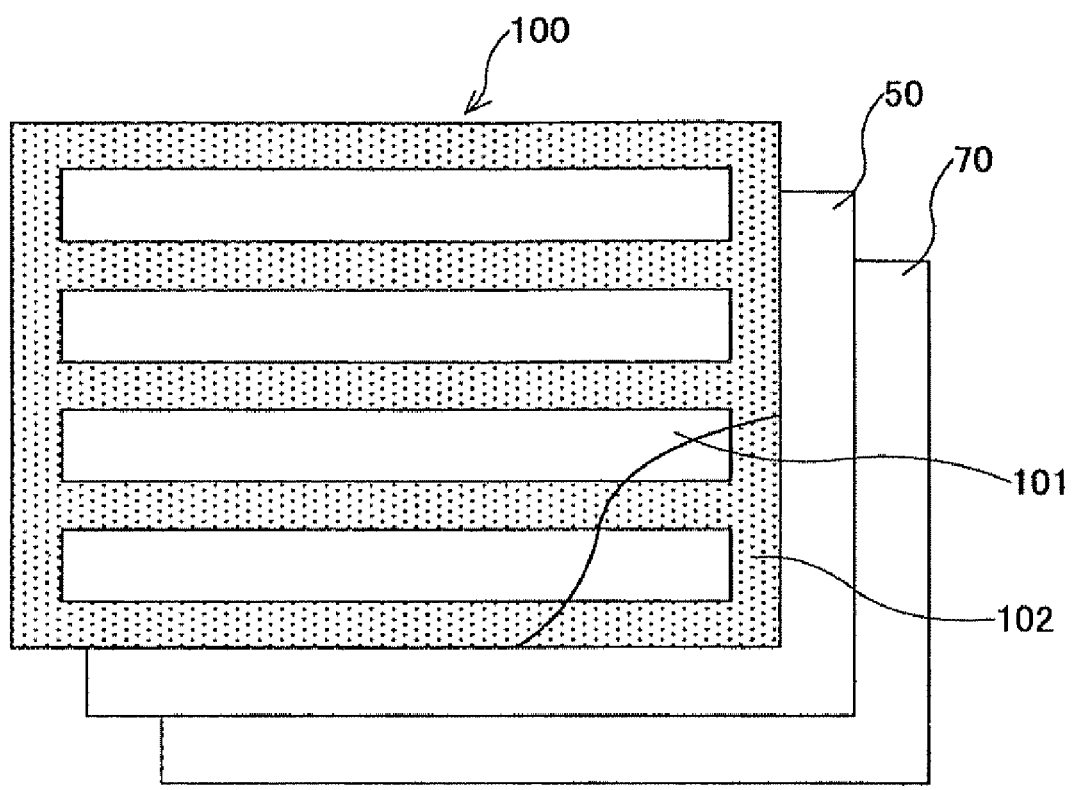
FIG. 12 is a schematic diagram showing a touch panel protection sheet according to a seventh embodiment of the present invention.

FIG. 12 shows a touch panel protection sheet 100 (hereinafter referred to as "the protection sheet 100") according to a seventh embodiment of the present invention for application to a touch panel 50 on the surface of a liquid crystal panel 70. The protection sheet 100 includes a stripe adhesive layer 102 having slight adhesion on the back surface of a transparent PET film body 101. The adhesive layer 102 is represented by a dotted pattern (in FIG. 12, under the transparent PET film body 101) and is provided on part of the PET film body 101. It should be noted that the adhesive layer 102 is represented by the dotted pattern also in the drawings described below.

Since the adhesive layer 102 has a stripe shape, compared to a structure in which the adhesive layer 102 is formed on an entire surface of the PET film body 101, there is less probability that air bubbles are generated and foreign matters are caught upon application of the protection sheet 100 to the touch panel 50.

When applying the protection sheet 100 to the touch panel 50, by applying one end of the protection sheet 100 to the touch panel and applying the remaining portion of the protection sheet 100 in the longitudinal direction of the stripes thereof, the application is smoothly performed. In addition, since the adhesive layer 102 has the stripe shape, it is also easy to partially separate the applied protection sheet 100.

Figure 13:
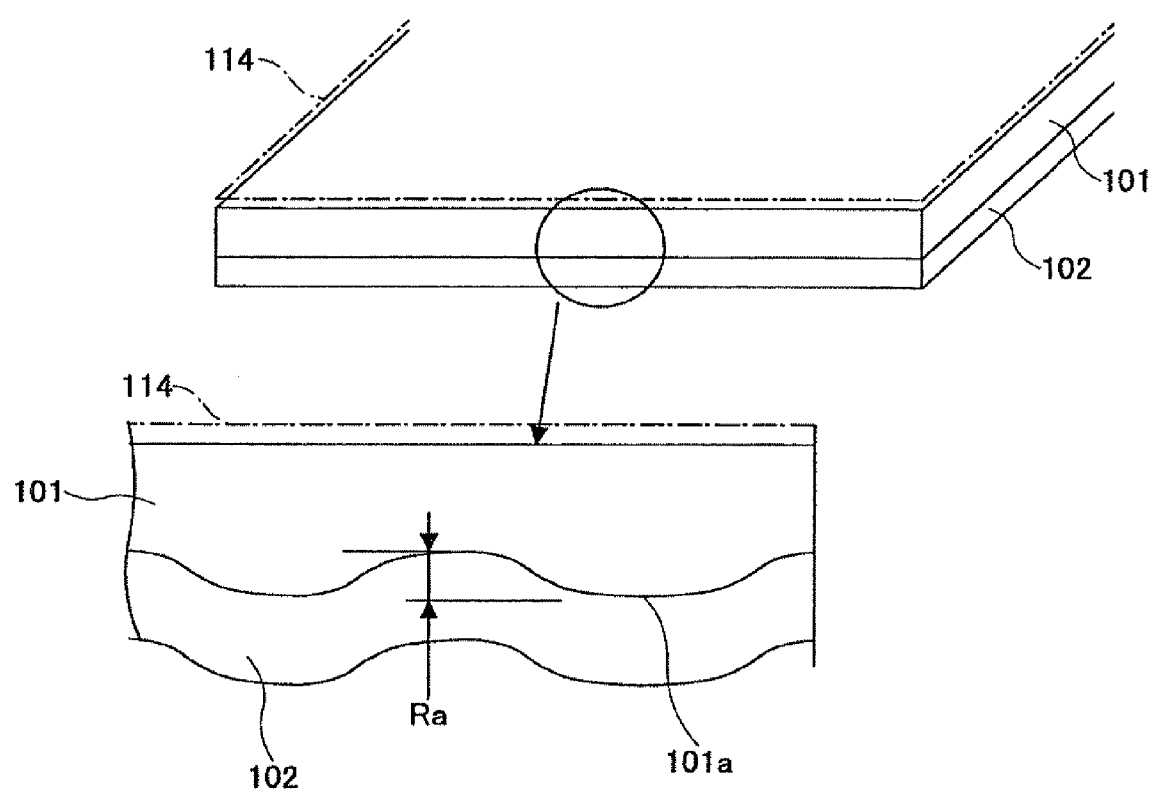
FIG. 13 is a schematic diagram showing a part of the protection sheet shown in FIG. 12 in an enlarged manner.

As shown in FIG. 13, the PET film body 101 includes a coarse back surface 101a having a roughness Ra of about 50 μm. Hence, in a state where the protection sheet 100 is applied to the touch panel 50, the space between a surface of the touch panel 50 and the back surface 101a of the PET film body 101 becomes uneven. Thus, emergence of Newton rings, which are obtrusive, is prevented.

It should be noted that a hard coat layer 114 may be provided on a surface of the PET film body 101.

Eighth Embodiment

Figure 14:
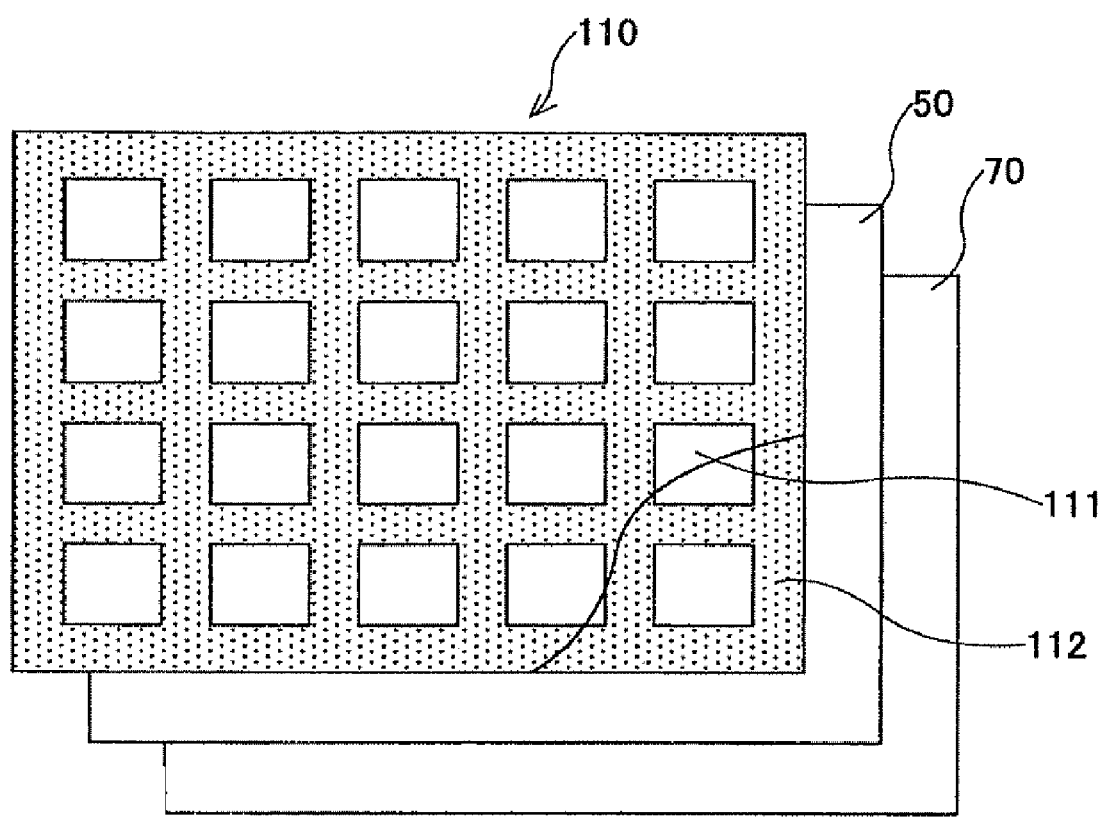
FIG. 14 is a schematic diagram showing a touch panel protection sheet according to an eighth embodiment of the present invention.

FIG. 14 shows a touch panel protection sheet 110 (hereinafter referred to as "the protection sheet 110") according to an eighth embodiment of the present invention. The protection sheet 110 includes a grid adhesive layer 112 having slight adhesion on the back surface of a transparent PET film body 111.

Since the adhesive layer 112 has a grid pattern, it is possible to apply the protection sheet 110 to the touch panel 50 grid by grid. Thus, there is less probability that air bubbles are generated and foreign matters are caught upon application of the protection sheet 110 to the touch panel 50. Additionally, it is possible to separate the applied protection sheet 110 from the touch panel 50 grid by grid.

Ninth Embodiment

Figure 15A:
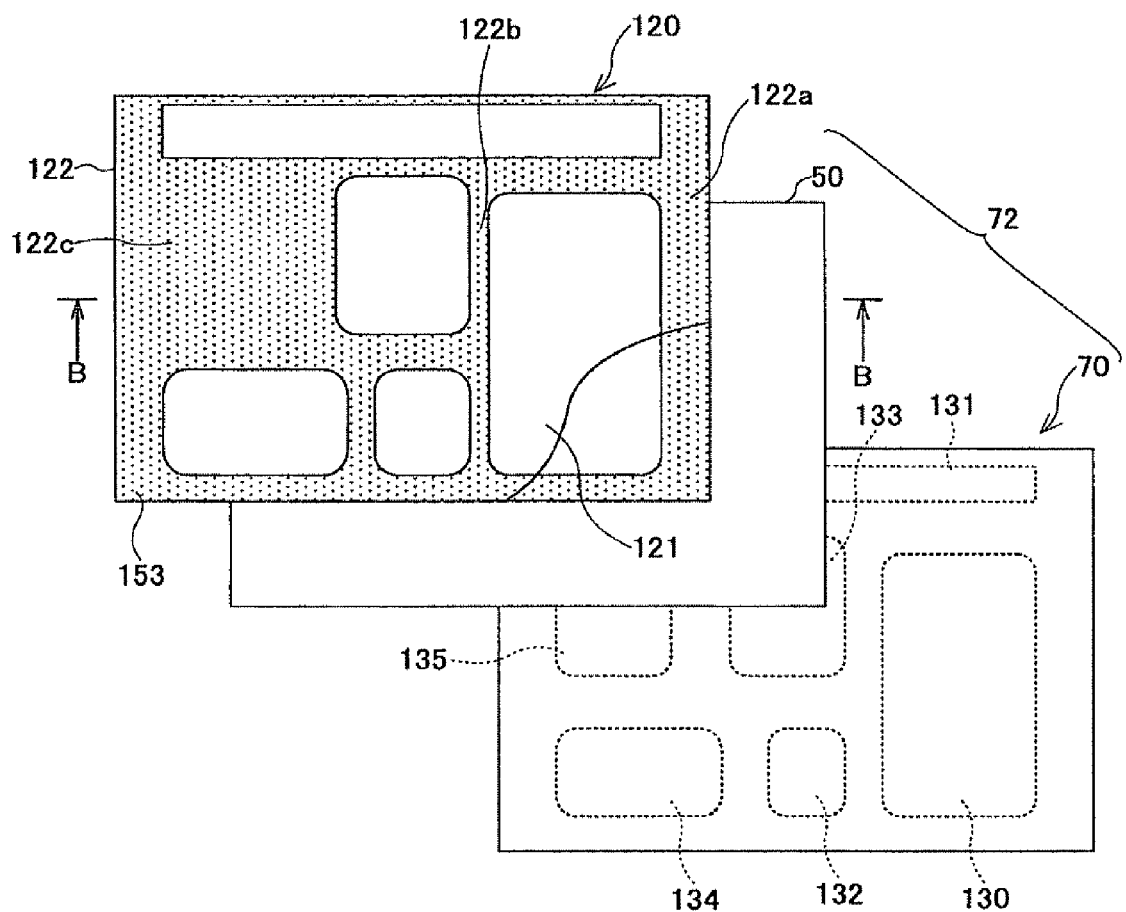
FIG. 15A is a schematic diagram showing a touch panel protection sheet according to a ninth embodiment of the present invention.
Figure 15B:
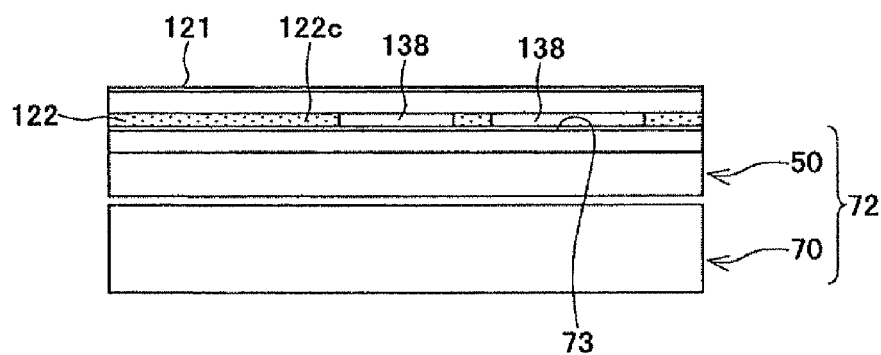
FIG. 15B is a cross-sectional view of the protection sheet shown in FIG. 15A.

FIG. 15A shows a touch panel protection sheet 120 (hereinafter referred to as "the protection sheet 120") according to a ninth embodiment of the present invention. The protection sheet 120 includes an adhesive layer 122 having slight adhesion on the back surface of a transparent PET film body 121. As shown in FIG. 15B, the protection sheet 120 is mounted on the top surface of a display/input part 73 of the PDA 72 constructed by the liquid crystal panel 70 and the touch panel 50 provided on the liquid crystal panel 70, i.e., the display/input part 73 being on the top surface of the touch panel 50.

Those portions surrounded by two-dotted chain lines in the liquid crystal panel 70 are image keys 130 through 135 that are displayed when the power of the PDA 72 is turned ON. The image keys 130 through 134 are frequently used. The image key 135 is a shut down key and an erroneous operation of the image key 135 causes disadvantage.

The adhesive layer 122 is formed on the portion other than those portions corresponding to the image keys 130 through 134. In other words, the adhesive layer 122 is formed on the periphery of the PET film body 121, the boundaries among the adjacent keys 130 through 134, and the portion corresponding to the image key 135. As will be appreciated, in FIG. 15A, 122a denotes a part of the adhesive layer 122 corresponding to the periphery portion of the PET film body 121, 122b denotes a part of the adhesive layer 122 corresponding to the boundaries among the adjacent keys 130 through 134, and 122c denotes a part of the adhesive layer 122 corresponding to the image key 135.

FIG. 15B shows a state where the protection sheet 120 is mounted on and applied to the touch panel 50. Since the adhesive layer 122 is partially formed, there is less probability that air bubbles are generated and foreign matters are caught upon application of the protection sheet 120 to the touch panel 50.

In a state where the power of the PDA 72 is turned ON and the PDA 72 is used, the image keys 130 through 135 of the liquid crystal panel 70 can be seen through the protection sheet 120 and the touch panel 50. The image keys 130 through 135 are pressed and operated via the top surface of the protection sheet 120.

In the portions corresponding to the image keys 130 through 134, the PET film body 121 faces the touch panel 50 via an air layer 138 (FIG. 15B) therebetween, and the load (input load) required for an input is 10-100 gr, which is a normal value.

However, in the portion corresponding to the image key 135, the space between the PET film body 121 and the touch panel 50 is filled with the part 122c of the adhesive layer 122. Hence/compared to the portions having the air layer 138, the protection sheet 120 is less easily bent. Thus, the input load range is 40-150 gr, which is generally higher range than the normal value range. Accordingly, an input is not made when the image key 135 is unintentionally touched, but is made when the image key 135 is intentionally pressed. Thus, there is less probability that the PDA 72 is erroneously shut down.

When an operation of pressing a portion of the adhesive layer 122 of the protection sheet 120 is frequently performed, there is a possibility that the adhesive layer 122 is separated from the touch panel 50, the air enters the separated portion, and the part that is frequently subjected to the pressing operation becomes clouded when seen from the top surface of the protection sheet 120. However, in the portions of the protection sheet 120 corresponding to the image keys 130 through 134, which are the portions frequently subjected to the pressing operation, the adhesive layer 122 does not exist. Hence, the disadvantage that clouding may occur as mentioned above does not exist. Additionally, since the image key 135 is not frequently pressed, even if the part 122c of the adhesive layer 122 exists, the above-mentioned clouding does not occur.

The protection sheet 120 may have a structure in which the part 122c, corresponding to the image key 135, is eliminated, and the adhesive layer 122 does not exist in the portions corresponding to the image keys 130 through 135. Alternatively, the protection sheet 120 may have a structure in which the adhesive layer 122 exists in all of the portions corresponding to the image keys 130 through 135.

Further, the completed touch panel 50 may include the protection sheet 120 applied thereon as a component forming the touch panel 50.

Tenth Embodiment

Figure 16A:
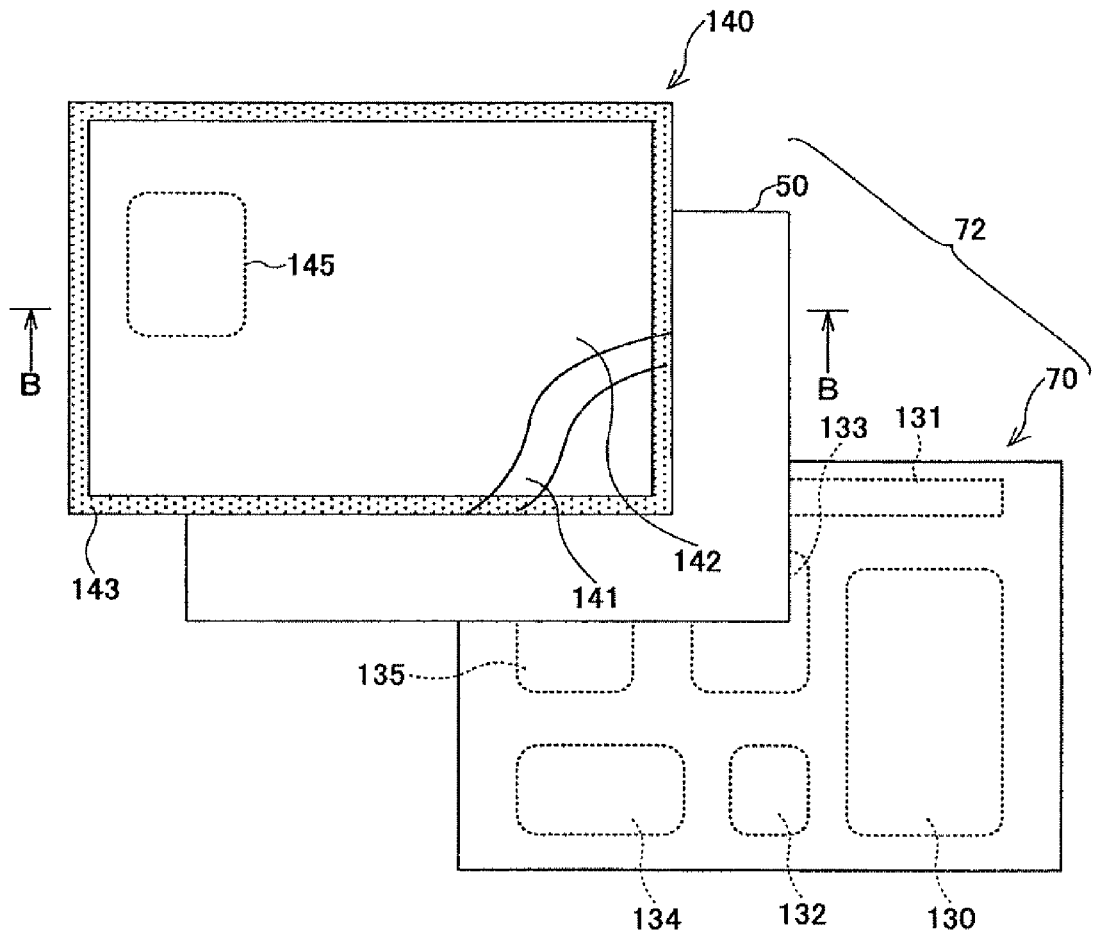
FIG. 16A is a schematic diagram showing a touch panel protection sheet according to a tenth embodiment of the present invention.
Figure 16B:
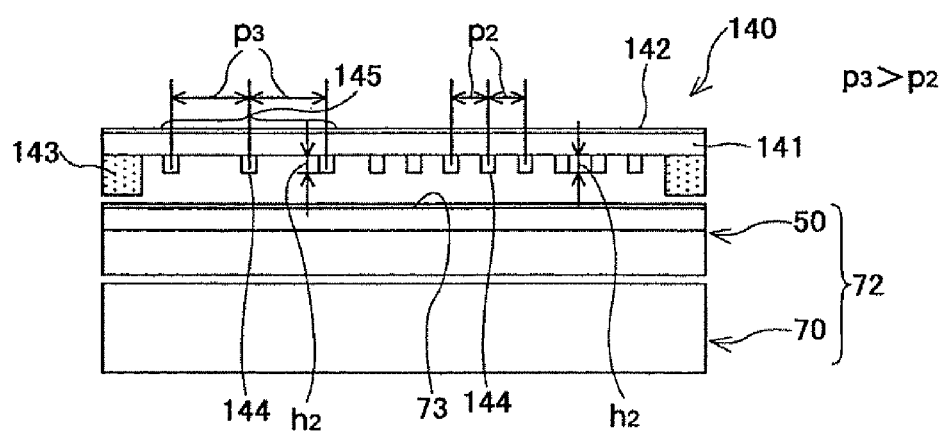
FIG. 16B is a cross-sectional view of the protection sheet shown in FIG. 16A.

FIG. 16A shows a touch panel protection sheet 140 (hereinafter referred to as "the protection sheet 140") according to a tenth embodiment of the present invention. Referring to FIG. 16B, in the protection sheet 140, a hard coat layer 142 is provided on a surface of a transparent PET film body 141. Dot spacers 144 are provided over the back surface of the PET film body 141. An adhesive layer 143 having slight adhesion is provided on the periphery of the back surface of the PET film body 141. The protection sheet 140 is mounted on and bonded to the top surface of the display/input part 73 of the PDA 72 that is constructed by the liquid crystal panel 70 and the touch panel 50 on the liquid crystal panel 70, i.e., the display/input part 73 being disposed on the top surface of the touch panel 50. Similarly to the liquid crystal panel 70 shown in FIG. 15A, the liquid crystal panel 70 in this embodiment also displays the image keys 130 through 135.

Referring to FIG. 16B, the dot spacers 144 have a standard height h2 and are arranged in a dispersed manner with a standard pitch of p2. It should be noted that, in the back surface of the PET film body 141, in a region 145 corresponding to the image key 135, the dot spacers 144 are arranged with a pitch of p3, which is wider than the standard pitch of p2.

Figure 17A:
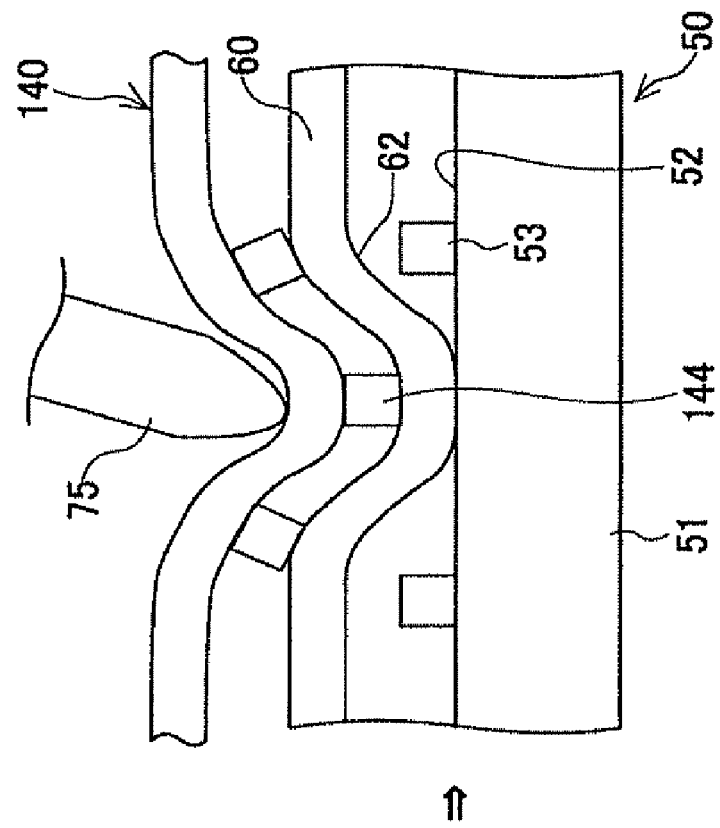
FIGS. 17A and 17B are schematic diagrams for explaining the function of dot spacers of a touch panel protection sheet.
Figure 17B:
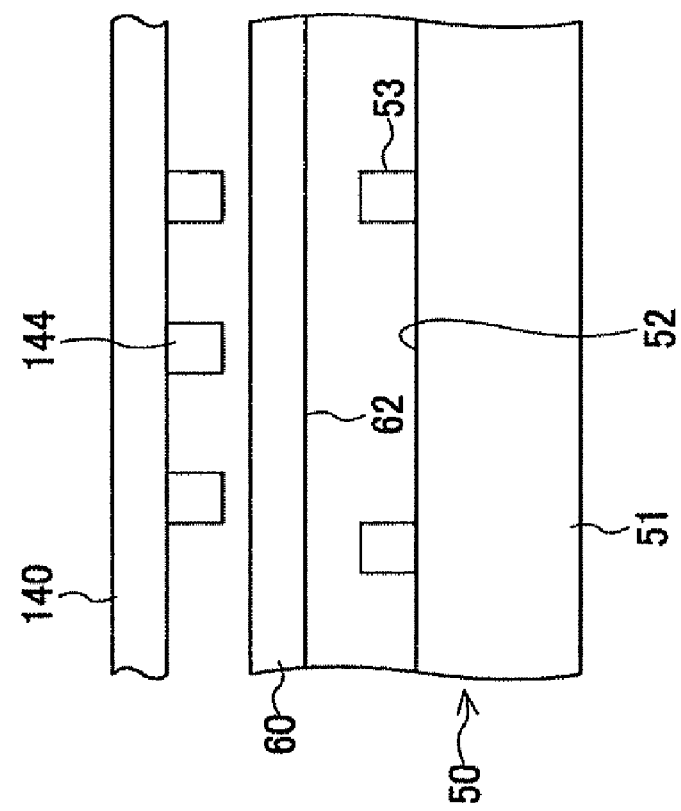

As shown in FIGS. 17A and 17B, when the protection sheet 140 is pressed and bent, the dot spacers 144 press the top surface of the film 60, which is above the touch panel 50, and bend the film 60. Accordingly, by providing the protection sheet 140 having the dot spacers 144, the input load is reduced compared to the case where no protection sheet 140 is provided.

Figure 18:
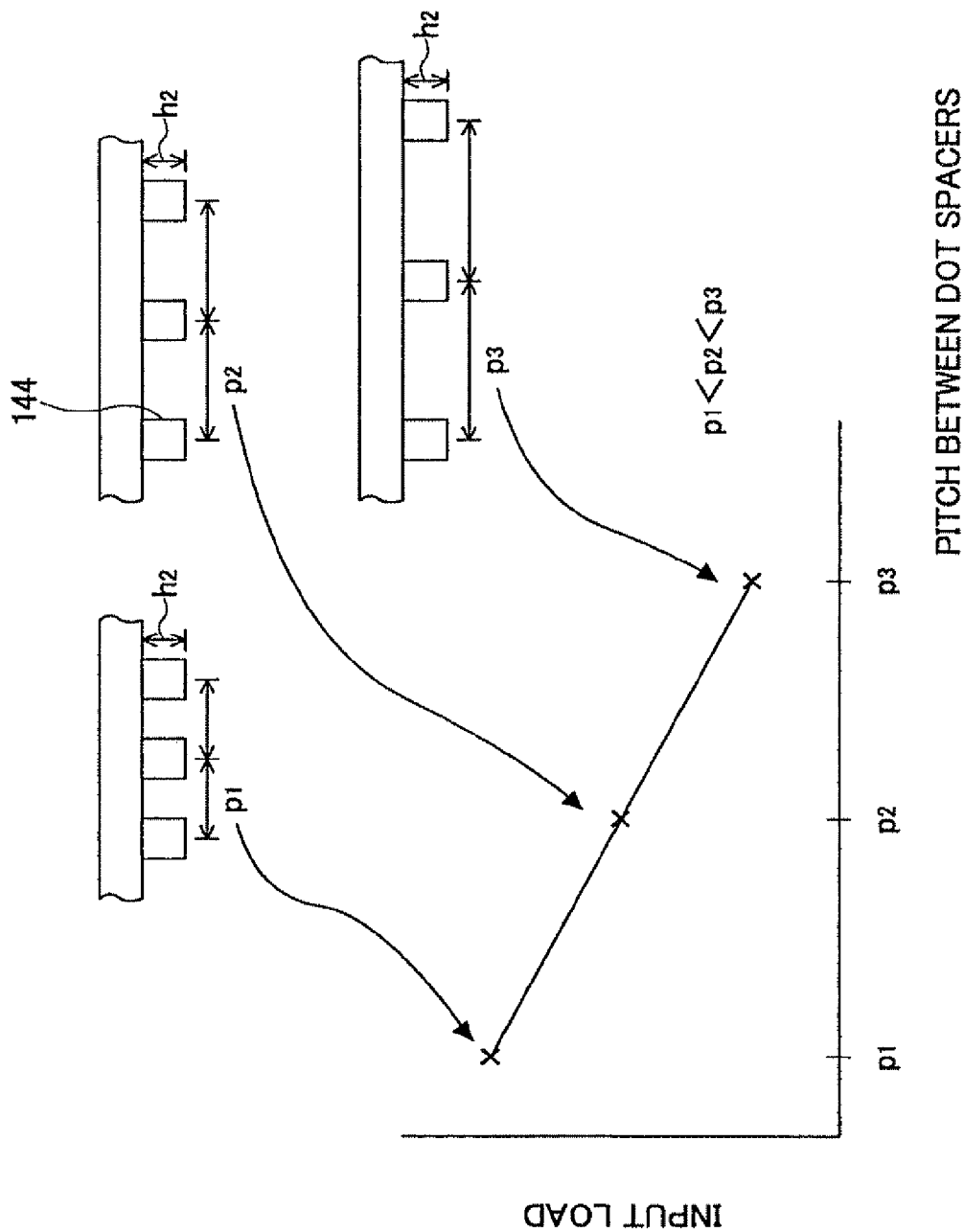
FIG. 18 is a graph showing the relationship between input load and the pitch of the dot spacers.

A description is given below of the relationship between the input load and the pitch of the dot spacers 144. As shown in FIG. 18, when the pitch of the dot spacers 144 is narrow, the input load is high. On the other hand, when the pitch of the dot spacers 144 is increased, the input load becomes lower.

Thus, in the portions corresponding to the image keys 130 through 134, since the dot spacers 144 are arranged in a dispersed manner with the pitch of p3, the input load is 10-100 gr, which is substantially a normal value.

However, in the portion corresponding to the image key 135, since the dot spacers 144 are arranged in a dispersed manner with the pitch of p2, the input load range is 40-150 gr, which in general is higher range than the normal value range. Thus, an input is not made when the image key 135 is unconsciously touched but is made only when the image key 135 is consciously pressed. Hence, there is less possibility that the PDA 72 is erroneously shut down.

Additionally, the pitch of the dot spacers 144 may be varied also in the portions corresponding to the image keys 130 through 134 in accordance with the frequency of usage.

Eleventh Embodiment

Figure 19A:
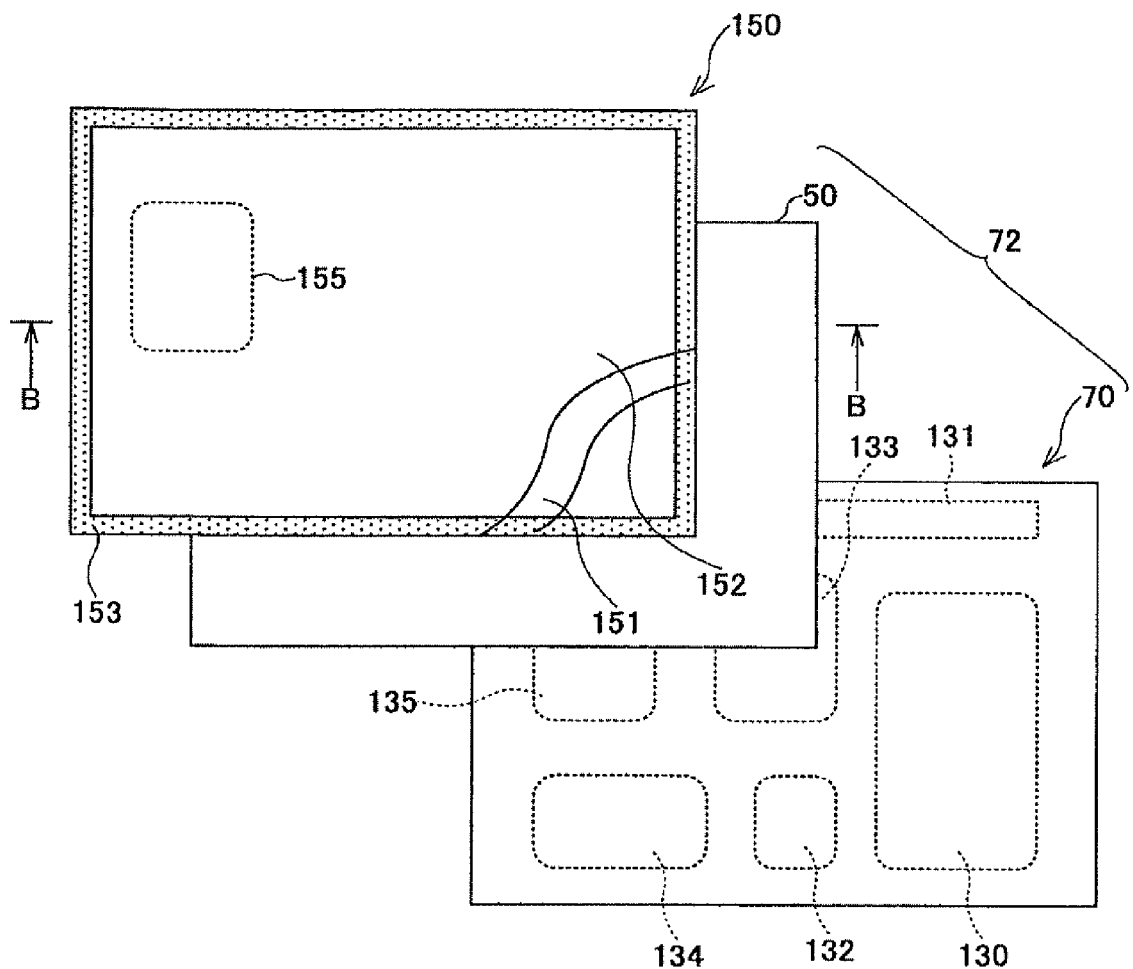
FIG. 19A is a schematic diagram showing a touch panel protection sheet according to an eleventh embodiment of the present invention.
Figure 19B:
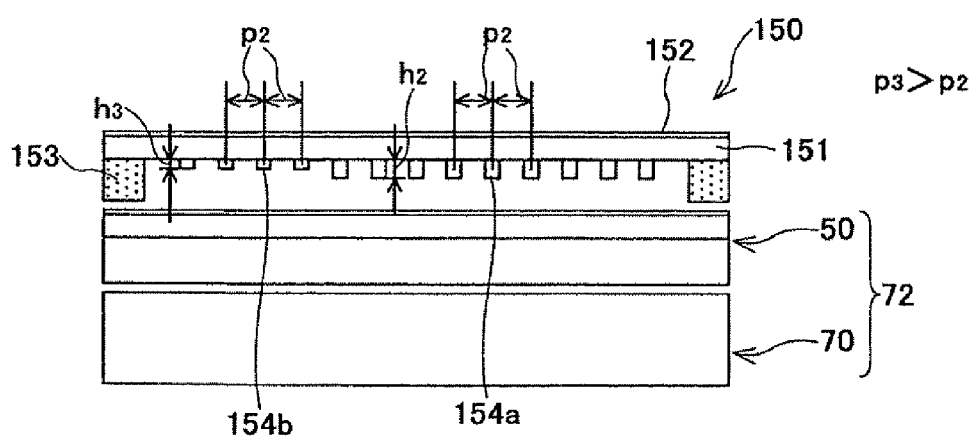
FIG. 19B is a cross-sectional view of the protection sheet shown in FIG. 19A.

FIG. 19A shows a touch panel protection sheet 150 (hereinafter referred to as "the protection sheet 150") according to an eleventh embodiment of the present invention. Referring to FIG. 19B, in the protection sheet 150, a hard coat layer 152 is provided on a surface of a transparent PET film body 151. Dot spacers 154a and 154b are provided over the back surface of the PET film body 151. An adhesive layer 153 having slight adhesion is provided on the periphery of the back surface of the PET film body 151. The protection sheet 150 is mounted on and bonded to the top surface of the display/input part 73 of the PDA 72 that is constructed by the liquid crystal panel 70 and the touch panel 50 on the liquid crystal panel 70, i.e., the display/input part 73 being disposed on the top surface of the touch panel 50. Similarly to the liquid crystal panel 70 shown in FIG. 15A, the liquid crystal panel 70 in this embodiment also displays the image keys 130 through 135.

The dot spacers 154a have the standard height of h2 and are arranged in a dispersed manner with the standard pitch of p2. However, in the back surface of the PET film body 151, in a region 155 (FIG. 19A) corresponding to the image key 135, the dot spacers 154b having a height of h3, which is lower than h2, are arranged with the standard pitch of p2.

A description is given below of the relationship between the input load and the height of the dot spacers (154a, 154b). As shown in FIG. 20, under the condition that the pitch of the dot spacers (154a, 154b) is constant, when the height of the dot spacers is high, the input load is reduced. On the other hand, when the height of the dot spacers is low, the input load is increased.

Thus, in the portions corresponding to the image keys 130 through 134, since the dot spacers 154a having the height of h2 are arranged in a dispersed manner, the input load is 10-100 gr, which is substantially a normal value.

However, in the portion corresponding to the image key 135, since the dot spacers 154b having the height of h3, which is lower than h2, are arranged in a dispersed manner, the input load range is 40-150 gr, which in general is higher range than the normal value range. Hence, an input is not made when the image key 135 is unconsciously touched but is made only when the image key 135 is consciously pressed. Accordingly, there is less possibility that the PDA 72 is erroneously shut down.

Additionally, dot spacers having different heights may be provided also in the portions corresponding to the image keys 130 through 134 in accordance with the frequency of usage.

Twelfth Embodiment

Figure 21:
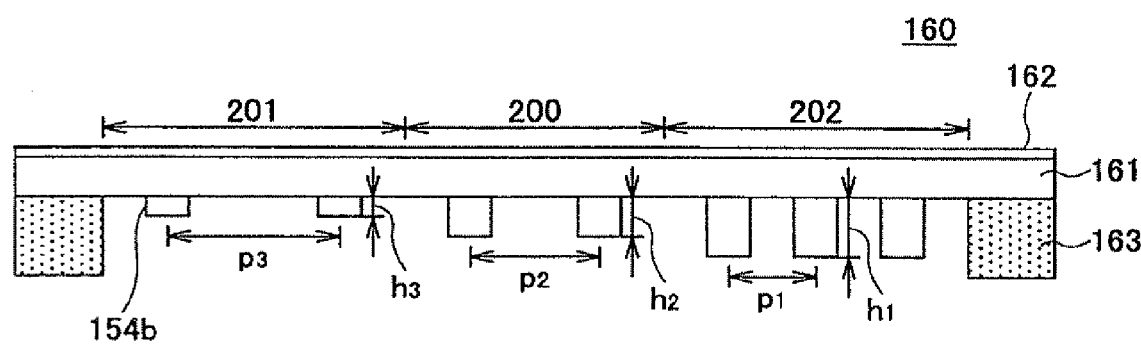
FIG. 21 is a cross-sectional view of a touch panel protection sheet according to a twelfth embodiment of the present invention.

FIG. 21 shows a touch panel protection sheet 160 (hereinafter referred to as "the protection sheet 160") according to a twelfth embodiment of the present invention. In the protection sheet 160, a hard coat layer 162 is provided on a surface of a transparent PET film body 161. Dot spacers are arranged over the back surface of the PET film body 161 while varying both height and pitch of the dot spacers. An adhesive layer 163 having slight adhesion is provided on the periphery of the back surface of the PET film body 161.

In a region 200, the dot spacers 154a having the height of h2 are arranged in a dispersed manner with the standard pitch of p2. In a region 201, the dot spacers 154b having the height of h3 are arranged in a dispersed manner with the pitch of p3. In a region 202, dot spacers 154c having a height of h1 are arranged in a dispersed manner with a pitch of p1. In the region 201, the input load is higher than the normal value. In the region 202, the input load is lower than the normal value. By arranging the region 202 to a portion corresponding to an image key that is frequently subjected to an input operation, an operator of a PDA having the protection sheet 160 is less tired, and the operationality of the PDA is improved.

The present invention is not limited to the specifically disclosed embodiments, and variations and modifications may be made without departing from the scope of the present invention.

The present application is based on Japanese priority application No. 2004-096230 filed on Mar. 29, 2004, the entire contents of which are hereby incorporated by reference.

What is claimed is:

1. A protection sheet to be provided on a surface of a touch panel, which surface is adapted to be subjected to an input operation, the protection sheet comprising:
a film body; and
an adhesive layer provided on a portion of the back surface of the film body;
wherein the portion of the back surface of the film body on which the adhesive layer is provided corresponds to a portion of the protection sheet that has a higher input load than another portion of the protection sheet.

2. A protection sheet to be provided on a surface of a touch panel, which surface is adapted to be subjected to an input operation, the protection sheet comprising:
- a film body; and
- a plurality of dot spacers provided on a back surface of the film body in a dispersed manner,
- wherein the dot spacers are arranged in a first region with a first pitch narrower than a second pitch with which the dot spacers are arranged in a second region, an input load in the first region being higher than an input load in the second region.

3. A protection sheet to be provided on a surface of a touch panel, the surface being adapted to be subjected to an input operation, the protection sheet comprising:
- a film body; and
- a plurality of dot spacers provided on a back surface of the film body in a dispersed manner,
- wherein the dot spacers are arranged in a first region with a first height higher than a second height with which the dot spacers are arranged in a second region, an input load in the first region being lower than an input load in the second region.

4. A touch panel, comprising:
- a membrane adapted to receive a pressing operation and/or a rubbing operation from an external pen; and
- a protection sheet provided on the membrane, the protection sheet including a film body, and a plurality of dot spacers provided on a back surface of the film body in a dispersed manner,
- wherein the dot spacers are arranged in a first region with a first pitch narrower than a second pitch with which the dot spacers are arranged in a second region, an input load in the first region being higher than an input load in the second region.

5. A touch panel, comprising:
- a membrane adapted to receive a pressing operation and/or a rubbing operation from an external pen; and
- a protection sheet provided on the membrane, the protection sheet including a film body and dot spacers provided on a back surface of the film body in a dispersed manner the protection sheet comprising,
- a film body; and
- a plurality of dot spacers provided on a back surface of the film body in a dispersed manner,
- wherein the dot spacers are arranged in a first region with a first pitch narrower than a second pitch with which the dot spacers are arranged in a second region, an input load in the first region being higher than an input load in the second region.

6. A touch panel, comprising:
- a membrane adapted to receive a pressing operation and/or a rubbing operation from an external pen; and
- a protection sheet provided on the membrane, the protection sheet including a film body and an adhesive layer provided on a portion of a back surface of the film body;
- wherein the portion of the back surface of the film body on which the adhesive layer is provided corresponds to a portion of the protection sheet that has a higher input load than another portion of the protection sheet.

* * * * *

UNITED STATES PATENT AND TRADEMARK OFFICE
CERTIFICATE OF CORRECTION

PATENT NO. : 7,636,084 B2  Page 1 of 1
APPLICATION NO. : 12/199384
DATED : December 22, 2009
INVENTOR(S) : Takashi Nakajima It is certified that error appears in the above-identified patent and that said Letters Patent is hereby corrected as shown below:

Title page, Column 1, under
"(65)        Prior Publication Data
        US 2008/0309642 A1     Dec. 18, 2008" insert
            -- Related U.S. Application Data
(62) Division of Application No. 10/870,029, filed Jun. 18, 2004, now Pat. No. 7,432,913. --.

Signed and Sealed this

Twenty-third Day of March, 2010

David J. Kappos
*Director of the United States Patent and Trademark Office*